United States Patent
Carmichael et al.

(10) Patent No.: US 10,575,057 B2
(45) Date of Patent: *Feb. 25, 2020

(54) SYSTEMS AND METHODS FOR IMPROVING ACCURACY IN MEDIA ASSET RECOMMENDATION MODELS

(71) Applicant: Rovi Guides, Inc., Santa Clara, CA (US)

(72) Inventors: Craig Carmichael, Lakeville, MN (US); Sashikumar Venkataraman, Andover, MA (US)

(73) Assignee: ROVI GUIDES, INC., San Jose, CA (US)

( * ) Notice: Subject to any disclaimer, the term of this patent is extended or adjusted under 35 U.S.C. 154(b) by 48 days.

This patent is subject to a terminal disclaimer.

(21) Appl. No.: 14/694,925

(22) Filed: Apr. 23, 2015

(65) Prior Publication Data

US 2016/0316268 A1 Oct. 27, 2016

(51) Int. Cl.
| | |
|---|---|
| H04N 21/434 | (2011.01) |
| H04N 21/435 | (2011.01) |
| H04N 21/466 | (2011.01) |
| H04N 21/45 | (2011.01) |
| H04N 21/475 | (2011.01) |
| H04N 21/81 | (2011.01) |
| H04N 21/658 | (2011.01) |
| H04N 21/25 | (2011.01) |

(52) U.S. Cl.
CPC ....... *H04N 21/4662* (2013.01); *H04N 21/252* (2013.01); *H04N 21/4532* (2013.01); *H04N 21/4661* (2013.01); *H04N 21/4755* (2013.01); *H04N 21/4756* (2013.01); *H04N 21/6582* (2013.01); *H04N 21/812* (2013.01)

(58) Field of Classification Search
CPC ..................................... H04N 21/222
USPC ..................................... 725/91, 93
See application file for complete search history.

(56) References Cited

U.S. PATENT DOCUMENTS

| | | |
|---|---|---|
| 5,113,483 A | 5/1992 | Keeler et al. |
| 5,444,820 A | 8/1995 | Tzes et al. |
| 6,239,794 B1 | 5/2001 | Yuen et al. |
| 6,388,714 B1 | 5/2002 | Schein et al. |

(Continued)

OTHER PUBLICATIONS

Bell et al., "Lessons from the Netflix Prize Challenge", AT&T Labs—Research, Florham Park, NJ, 2007 5 pages.

(Continued)

*Primary Examiner* — Mushfikh I Alam
(74) *Attorney, Agent, or Firm* — Haley Guiliano LLP

(57) ABSTRACT

Methods and systems for determining an error value based on comparing an expected media asset similarity value corresponding to a first media asset and a second media asset, as determined using a model, to a media asset similarity value determined from user preference information associated with multiple data spaces. User preference information is received from two data spaces that are managed by different content providers. User preference information from the two data spaces is normalized and an indication of similarity between two media assets is determined. The indication of similarity is compared to an expected similarity value received from a model and an error value is determined based on the comparison of the expected similarity value and the similarity value.

18 Claims, 9 Drawing Sheets

(56) References Cited

U.S. PATENT DOCUMENTS

| | | | |
|---|---|---|---|
| 6,564,378 B1 | 5/2003 | Satterfield et al. | |
| 6,756,997 B1 | 6/2004 | Ward, III et al. | |
| 6,973,663 B1 | 12/2005 | Brown | |
| 7,165,098 B1 | 1/2007 | Boyer et al. | |
| 7,644,427 B1 | 1/2010 | Horvitz et al. | |
| 7,761,892 B2 | 7/2010 | Ellis et al. | |
| 8,046,801 B2 | 10/2011 | Ellis et al. | |
| 8,073,194 B2* | 12/2011 | Lienhart | G06F 17/30802 348/E7.036 |
| 8,347,326 B2* | 1/2013 | Weitzenfeld | H04H 60/33 705/14.41 |
| 8,484,511 B2* | 7/2013 | Tidwell | H04H 60/64 707/700 |
| 8,572,017 B2 | 10/2013 | Hong et al. | |
| 8,671,346 B2* | 3/2014 | Hua | G06F 17/30793 715/716 |
| 8,843,965 B1* | 9/2014 | Kurapati | H04N 5/44543 725/37 |
| 8,925,024 B2* | 12/2014 | Wright | G06K 9/00765 725/105 |
| 2002/0059094 A1* | 5/2002 | Hosea | H04N 21/25891 725/10 |
| 2002/0104087 A1 | 8/2002 | Schaffer et al. | |
| 2002/0174430 A1 | 11/2002 | Ellis et al. | |
| 2003/0110499 A1 | 6/2003 | Knudson et al. | |
| 2003/0126601 A1 | 7/2003 | Roberts et al. | |
| 2003/0236582 A1 | 12/2003 | Zamir et al. | |
| 2005/0022239 A1 | 1/2005 | Meuleman et al. | |
| 2005/0251827 A1 | 11/2005 | Ellis et al. | |
| 2006/0174275 A1 | 8/2006 | Gutta | |
| 2007/0130610 A1* | 6/2007 | Aarnio | H04H 40/27 725/134 |
| 2008/0222670 A1* | 9/2008 | Lee | G09B 7/02 725/10 |
| 2008/0244634 A1 | 10/2008 | Van Doorn | |
| 2008/0320516 A1 | 12/2008 | Yee et al. | |
| 2009/0055385 A1 | 2/2009 | Jeon et al. | |
| 2010/0138443 A1 | 6/2010 | Ramakrishnan et al. | |
| 2010/0153885 A1 | 6/2010 | Yates | |
| 2010/0169343 A1 | 7/2010 | Kenedy | |
| 2010/0185579 A1* | 7/2010 | Hong | G06F 17/30873 706/52 |
| 2010/0287033 A1 | 11/2010 | Mathur | |
| 2010/0325125 A1* | 12/2010 | Bomfim | G06F 17/30053 707/759 |
| 2012/0036523 A1 | 2/2012 | Weintraub | |
| 2012/0151513 A1* | 6/2012 | Zigmond | H04H 60/33 725/14 |
| 2012/0198509 A1 | 8/2012 | Arya et al. | |
| 2013/0111526 A1 | 5/2013 | Glowaty | |
| 2013/0247080 A1* | 9/2013 | Vinson | H04N 21/44213 725/14 |
| 2014/0089955 A1* | 3/2014 | Lee | G06K 9/00771 725/12 |
| 2014/0244631 A1* | 8/2014 | Arthur | G06F 17/2785 707/723 |
| 2015/0067708 A1 | 3/2015 | Jensen | |
| 2015/0296228 A1* | 10/2015 | Chen | G06F 17/30029 725/34 |
| 2016/0094883 A1* | 3/2016 | Tidwell | H04N 21/4524 725/109 |
| 2016/0149950 A1 | 6/2016 | Carmichael et al. | |
| 2016/0314404 A1 | 10/2016 | Carmichael | |
| 2016/0314410 A1 | 10/2016 | Carmichael | |
| 2016/0316238 A1 | 10/2016 | Carmichael | |

OTHER PUBLICATIONS

Shi et al., "CLiMF: Learning to Maximize Reciprocal Rank with Collaborative Less-is-More Filtering", Sep. 9-13, 2012, Dublin, Ireland, 8 pages.

Jahrer et al., "Combining Predictions for Accurate Recommender Systems", Jul. 25-28, 2010, Washington DC, 9 pages.

Jojic et al., "A Probabilistic Definition of Item Similiarity", Oct. 23-27, 2011, Chicago, Illinois, 8 pages.

Yehuda Koren, "Factorization Meets the Neighborhood: a Mutlifaceted Caollaborative Filtering Model", AT&T Labs, Research, Floham, Park, NY, Copyright Aug. 24-27, 2008, Las Vegas, Nevada 9 pages.

Salakhutdinov et al., "Restricted Boltzmann Machines for Collaborative Filtering", Univesity of Toronto, 2007, 8 pages.

István Pilászy, "Factorization-Based Large Scale Recommendation Algorithms, PhD Thesis" Jan. 2009, 110 pages.

Shi et al., "xCLiMF: Optimizing Expected Reciprocal Rank for Data with Multiple Levels of Relevance", Delft Univesity of Technology, Netherlands; Telefonica Research, Spain, Oct. 1216, 2013, Hong, Kong, China, 4 pages.

Yoshii, et al. "Hybrid Collaborative and Content-based Music Recommendation Using Probabilistic Model with Latent User Preferences", Graduate Schoo of Informatics, Koyoto University, JSPS Research Fellow (DCI), 2006, 6 pages.

Rendel et al, Factorization Model for Context-/Time-Aware Movie Recommendations, Sep. 30, 2010, Barcelona, Spain 6 pages.

International Search Report, International Application No. PCT/US2016/028587, dated Jun. 17, 2016 (13 pages).

\* cited by examiner

SYSTEMS AND METHODS FOR IMPROVING ACCURACY IN MEDIA ASSET RECOMMENDATION MODELS

BACKGROUND

Traditional systems may determine media asset recommendations for a user based on a single set of data gathered by a single content provider. For example, a traditional system may use a model to determine a recommendation of a media asset to a user based on another video asset that the user may have consumed or rated. Although recommendations based on the traditional system may be effective under some circumstances, these traditional systems have limited accuracy.

SUMMARY

Accordingly, systems and methods for determining error values for traditional training models based on user preference information from multiple data spaces are described. As referred to herein, the term "data space" refers to a collection of data associated with a content provider that includes preference information of a plurality of users with respect to a plurality of media assets. As referred to herein, the term "content provider" refers to an entity that provides media assets to users. For example, traditional content providers may include cable television providers such as Cablevision® and Comcast®. Other content providers can include entities that provide media assets to users over the Internet (e.g., Netflix®). As referred to herein, the term "preference information" refers to a collection of data associated with user's preferences for media assets. Preference information may include the user's level of enjoyment with respect to a media asset (e.g., three stars) that the user explicitly indicated, whether the user consumed the media asset, the length of time the user consumed the media asset, the percentage of the media asset that the user consumed, whether the user rated the media asset, the rating that the user gave to the media asset, whether the user paused the media asset, whether the user skipped portions of the media asset, whether the user interacted with ads while consuming the media asset, whether the user turned away from watching the media asset, whether the user paid a fee for consuming the media asset, the amount of the fee, the user's changes in mood while consuming the media asset, the user's changes in heart rate while consuming the media asset, the user's pupil dilations while consuming the media asset, whether the user consumed other episodes of the media asset if the media asset is an episode of a series, and a number of other episodes consumed by the user in the series.

For example, it may be advantageous for a cable television provider (e.g., Comcast®) to recommend a movie to a user. One way to provide a recommendation to the user is to determine which movies the user prefers and what about those movies she prefers. This may be accomplished in at least two ways. A model may be used to determine which movies are similar to other movies, in what way and to what degree, based on user preference information with respect to those movies. For example, a user may have watched the movie "Terminator." The model may have retrieved, from the user preference information, data indicating that the user watched the movie twice, watched it entirely, rewound the movie to watch specific scenes twice and rated a movie as 9 on a scale of 1 to 10. The model may determine, based on those facts, that the user likes "Terminator" a great deal. The model may then find another movie similar to "Terminator" to recommend to the user. Various ways to determine which movies are similar to each other are found in, for example, U.S. patent application Ser. No. 14/578,911, filed on Dec. 22, 2014, which is hereby incorporated by reference herein in its entirety.

Another way to provide a recommendation to a user is to determine, using a recommendation model, the user's expected level of enjoyment with respect to a specific media asset based on the user's level of enjoyment of other media assets. A model may be used to determine the user's expected level of enjoyment with respect to a media asset based on the user's preference information with respect to other media assets.

In both instances, it would be useful to provide recommendation models that may be trained to provide better accuracy of recommendations. This may be accomplished through the use of trainable parameters. As referred to herein, the term "trainable parameters" refers to variables within a recommendation model that may be adjusted based on input in order to improve accuracy of the recommendation model. Parameter values of a recommendation, as determined by the model, may be compared to more accurate values derived from multiple data spaces. An error value may be found based on the comparisons and later trainable parameters may be adjusted to minimize the error value.

In some aspects, control circuitry may determine an error value by comparing an expected media asset similarity value corresponding to a first media asset and a second media asset as determined using a model, to a media asset similarity value determined from user preference information associated with multiple data spaces. As referred to herein, the term "expected media asset similarity value" refers to a similarity value between two media assets calculated by a model in order to determine how similar the two media assets are based on user preferences with respect to the two media assets. For example, the control circuitry may determine that an expected similarity value of two action movies is greater than an expected similarity value of an action movie and a comedy.

The control circuitry may receive first preference information of a first plurality of users, wherein the first preference information is associated with a first data space and describes preferences of the first plurality of users with respect to a first plurality of media assets. For example, a content provider may store user preference information that includes both data about user interactions with media assets as well as data about users' indicated level of enjoyment with respect to media assets. As referred to herein, the term "user interaction" refers to any action that a user takes with respect to a media asset. Data about user interactions may include whether the user consumed a media asset, the length of time the user spent consuming the media asset, the percentage of the media asset that the user consumed, whether the user rated the media asset, the rating the user gave the media asset, whether the user paused the media asset, whether the user interacted with ads while consuming the media asset, whether the user's eyes turned away from watching the media asset, whether the user paid a fee for consuming the media asset, the amount of the fee, whether the user consumed other episodes of the media asset if the media asset is an episode of a series, and a number of other episodes consumed by the user in the series.

As referred to herein, the term "user's level of enjoyment" refers to a scaled value, either explicitly entered by the user or determined by the control circuitry based on user preference information of how much the user enjoyed or may enjoy a media asset or a group of media assets. As referred to herein, the term "user's indicated level of enjoyment" refers to a scaled value, explicitly entered by the user, of how much the user enjoyed a media asset or a group of media assets. In some embodiments, the control circuitry may determine a user's level of enjoyment with respect to a media asset by analyzing user communications with respect to the media asset (e.g., a review of a movie by the user, user's social media communications, etc.). The control circuitry may determine the user's level of enjoyment with respect to the media asset by, for example, analyzing keywords found in the user's review of the media asset or the user's social media communications. In some embodiments, a user's level of enjoyment with respect to a media asset may be referred to as a "rating." For example, a user's indicated level of enjoyment with respect to a media asset may be a value of 3 stars on a scale of 0 stars to 5 stars. Another example of a user's indicated level of enjoyment with respect to a media asset may be a numeric value 5 on a scale between 0 and 10. Other scales may include percentages (e.g., 50% out of 100%), letter values such that a letter "A" may be at one end of a scale and a letter "F" may be at the other end of the scale. Letter values such as "A−" or "C+" may be possible to create a more particular scale. Another example of a scale may be whether the user liked a media asset or not or whether the user likes a first media asset more than a second media asset.

Control circuitry may learn a user's indicated level of enjoyment with respect to a media asset by generating for display a graphical display including a sliding bar, selectable icons, etc. For example, the user may be presented with a scale (e.g., a sliding bar) where she can use an input device (e.g., a mouse) to indicate on a sliding bar how much she enjoyed the media asset. The user may also be presented with selectable icons that may represent possible indications for the user to select. For example, she may be presented with a "like" indication and a "dislike" indication. The user may also be presented with a scale where the user may use a keyboard to enter the desired indication. For example, the user can enter a letter "B" based on a scale from "A" to "F".

The control circuitry may then receive second preference information, wherein the second preference information is associated with a second data space, describes preferences of a second plurality of users with respect to a second plurality of media assets, and is computed using a different metric than a metric that the first preference information is computed using, and wherein the second data space is managed by a content provider that does not manage the first data space. As referred to herein, the term "metric" refers to a set of values that represent user preference information with respect to a media asset. For example, both the first data space and the second data space may include data that indicates a length of time a user spent consuming a media asset before that user switched to another media asset or otherwise stopped consuming the media asset. The first data space may include that data as a number of minutes that the user spent consuming the media asset and the second data space may include that data as a percentage of the media asset that was consumed. It can be said that the two data spaces may use different metrics for this information. In another example, the first data space may use an XML file as a data structure to store preference information and the second data space may use a database file to store preference information. As a result, preference information from the two data spaces cannot be aggregated until the preference information is stored in a single data structure, i.e., put on a common metric.

The control circuitry may further normalize the first preference information and the second preference information such that both the first preference information and the second preference information are converted to a scheme on which a common metric may be applied. As referred to herein, the term "normalize" refers to merging data from multiple sources in such a way that a common metric may be applied to the merged data. To continue with the above example, one content provider may find it useful to store the data on the length of time that a user spent consuming a media asset as a number of minutes, while another content provider may find it useful to store the same data as a percentage of the media asset that was consumed. Both of these representations may be useful in order to determine how similar two media assets are, however, the percentage of the media asset consumed may be calculated based on the length of time the user spent consuming the media asset and the total length of the media asset. Conversely, the length of time that the user spent consuming a media asset may be calculated based on the total length of the media asset and the percentage consumed. Therefore, converting these values into one metric would still allow the control circuitry to calculate both values and at the same time store the values uniformly.

The control circuitry may then determine, using the normalized first preference information and the normalized second preference information, an indication of similarity between a first media asset and a second media asset, wherein the first preference information and the second preference information each comprise preference data corresponding to the first media asset and the second media asset. Once the control circuitry normalizes the user preference information from the first data space and the second data space and converts that information to one metric, the control circuitry may use the combined normalized preference information to calculate indications of similarity values between media assets. Additionally or alternatively, the control circuitry may determine users' level of enjoyment with respect to media assets based on the normalized first and second preference information.

The control circuitry may compare the indication of similarity to the expected media asset similarity value. For example, the control circuitry may determine that "Terminator" and "Rambo" have a similarity value of 0.8 on a scale of 0 to 1. The similarity value may be based on user preference information from multiple data spaces with respect to the two media assets. The control circuitry may also send a request to a rating model for an expected similarity value between the "Terminator" and "Rambo." The control circuitry may receive an expected similarity value of 0.6. The control circuitry may then determine a difference of 0.2 between the two values.

The control circuitry may further determine an error value based on the comparing. For example, the control circuitry may use the difference value of 0.2 together with other factors to determine an error value. Some of the factors may include the types of user preference information that were used to determine the similarity value, the weight given to each type of user preference information, specific attributes of user preference information (e.g., percentage of the media asset that the user has consumed) used in the determination, and the weight given to each attribute. Types of preference information include users' indicated level of enjoyment of media assets and data about user's interactions with media assets. Attributes of user preference information may include all user preference information attributes listed as part of the definition of user preference information.

In some embodiments, the control circuitry may use a specific method to normalize the first preference information and the second preference information such that both the first preference information and the second preference information are converted to a scheme on which a common metric may be applied. The control circuitry may determine, for the first media asset of the first plurality of media assets, whether the first media asset is also within the second plurality of media assets. In response to determining that the first media asset is also within the second plurality of media assets, the control circuitry may generate a record for the first media asset, where the record comprises preference information that is retrieved from both the first data space and the second data space. For example, the control circuitry may determine that a movie named "Rambo" has user preference information associated with it within the first data space. The control circuitry may further determine that the same movie may exist in the second data space and also have user preference information associated with it. The control circuitry may determine that entries for "Rambo" in both data spaces correspond to the same movie and create one record for both "Rambo" movies that will include preference information from both data spaces.

In some embodiments, the control circuitry may determine, for the first media asset of the first plurality of media assets, whether the first media asset is also within the second plurality of media assets. The control circuitry may make the determination by first identifying metadata of the first media asset. The control circuitry may then compare the identified metadata of the first media asset with metadata of a media asset of the second plurality of media assets. The control circuitry may further determine whether the metadata of the first media asset sufficiently matches the metadata of the media asset of the second plurality of media assets. In response to determining that the metadata of the first media asset sufficiently matches the metadata of the media asset of the second plurality of media assets, the control circuitry may determine that the content of the first media asset matches the content of the media asset of the second plurality of media assets. As referred to herein, the term "metadata" refers to any data associated with a media asset. Metadata may include the title of the media asset, year released, genre of the movie, director(s), writer(s), actors, and a description. In the example above, the control circuitry may determine that each "Rambo" movie includes metadata associated with the respective "Rambo" movie. The control circuitry may compare the titles and release dates of both movies in order to determine that the content of the movies is the same.

In some embodiments, the control circuitry may add to the record at least one of: data describing interactions of the first plurality of users with the first media asset, data describing indications of a level of enjoyment of the first media asset provided by the first plurality of users, data describing interactions of the second plurality of users with the media asset of the second plurality of media assets, and indications of a level of enjoyment of the media asset of the second plurality of media assets provided by the second plurality of users. For example, each data space may include user preference information in the form of both data about user interactions with respect to media assets and users' indicated level of enjoyment with respect to media assets. Both of those types of preference information may be added to the record created for the media asset.

In some embodiments, the control circuitry may determine, using the normalized first preference information and the normalized second preference information, the indication of similarity between the first media asset and the second media asset. The control circuitry may make the determination by first calculating a first confidence value in the indication of similarity between the first media asset and the second media asset based on the first preference information. The control circuitry may then calculate a second confidence value in the indication of similarity between the first media asset and the second media asset based on the second preference information. Once the two values have been calculated, the control circuitry may determine an average confidence value based on the first confidence value and the second confidence value and adjust the indication of similarity between the first media asset and the second media asset based on the average confidence value. For example, the control circuitry may determine that the first indication of similarity is more accurate than a second indication of similarity. The control circuitry may make the determination by, for example, analyzing the amount of user preference data that exists for each media asset in the respective data spaces. The control circuitry may determine a higher confidence value for the data space that includes more user preference data with respect to the first media asset and the second media asset. The control circuitry may further determine how much more user preference data exists for each media asset in the respective data space and based on that determination calculate the confidence values for each data space. The control circuitry may further determine an average confidence value based on the two calculated confidence values. If for example, the confidence value in user preference information in the first data space is 0.9 on a scale of 0 to 1, and the second confidence value is 0.1 on the same scale, the final indication of similarity will be much closer to the indication of similarity value that is based on the user preference information from the first data space.

In some embodiments, the control circuitry may base the first confidence value with respect to the indication of similarity between the first media asset and the second media asset on an amount of data associated with the first media asset and an amount of data associated with the second media asset in the first data space. For example, a first data space may include one million users and one million media assets. Out of those users, one hundred thousand may have watched a movie named "Die Hard" and two hundred thousand users may have watched a movie named "The Matrix." The content provider associated with that data space may have stored user preference information for all those users with respect to both "Die Hard" and "The Matrix."

A second data space, associated with a second content provider, may include only ten thousand users and have only one thousand users that watched "Die Hard" and only five hundred users that watched "The Matrix." The control circuitry may use these factors to compute the confidence values for both data spaces. As a result of the computation, the confidence value in the indication of similarity between these two movies would be higher for the first data space than the second data space.

In some embodiments, the control circuitry may determine the average confidence value based on the first confidence value and the second confidence value. The control circuitry may first determine a particularity of the first preference information and a particularity of the second preference information. As referred to herein the term "particularity of preference information" refers to a number of letters, words, or numbers that a user may choose in order to indicate her level of enjoyment of a media asset. For example, a scale where a user may choose her level of enjoyment of a media asset between the values of 1 and 10 is more particular than a scale between one star and five stars, and both of those scales are more particular than a "like/dislike" scale. The control circuitry may then calculate an average particularity value based on the particularity value of the first preference information and the particularity value of the second preference information and determine the average confidence value based on the average particularity value. For example, if the control circuitry determines that first preference information has a higher particularity value than second preference information, the control circuitry may adjust the confidence value in the first preference information to be greater than the confidence value in the second information.

In some embodiments, the control circuitry may provide the error value and data associated with the error value to a model and update the model based on the error value and the data associated with the error value. For example, the control circuitry may associate the error value with other data that can update the model to be more accurate when calculating media asset similarity values. The control circuitry may transmit the error value and the data to the model in order to improve the model's accuracy.

In some embodiments, the control circuitry may update the model based on the error value and the data associated with the error value by computing a derivative of a composition of both (1) a function used to determine the indication of similarity between a first media asset and the second media asset and (2) a function to determine the expected media asset similarity value and update the model based on the computed derivative. For example, the control circuitry may determine the composition of the functions to determine similarity between two media assets. Then, the control circuitry may calculate a derivative of the resulting function. The results of the derivative may be transmitted to the model so the model may be updated based on the derivative.

In some aspects, the control circuitry may receive first preference information of a first plurality of users, wherein the first preference information is associated with a first data space and describes preferences of the first plurality of users with respect to a first plurality of media assets. For example, a content provider may store user preference information that includes both data about user interactions with media assets as well as users' indicated level of enjoyment with respect to media assets. Data about user interactions may include whether the user consumed a media asset, the length of time the user spent consuming the media asset, the percentage of the media asset that the user consumed, whether the user rated the media asset, the rating the user gave the media asset, whether the user paused the media asset, whether the user interacted with ads while consuming the media asset, whether the user's eyes turned away from watching the media asset, whether the user paid a fee for consuming the media asset, the amount of the fee, whether the user consumed other episodes of the media asset if the media asset is an episode of a series, and a number of other episodes consumed by the user in the series. A user's level of enjoyment with respect to a media asset may be a value of 3 stars on a scale of 0 stars to 5 stars. Another example of a user's indicated level of enjoyment with respect to a media asset may be a numeric value 5 on a scale between 0 and 10. Other scales may include percentages (e.g., 50% out of 100%), letter values such as a letter "A" may be at one end of a scale and a letter "F" may be at the other end of the scale. Letter values such as "A–" or "C+" may be possible to create a more particular scale. Another example of a scale may be whether the user liked a media asset or not or whether the user liked a first media asset more than a second media asset.

Control circuitry may learn a user's indicated level of enjoyment with respect to a media asset by generating for display a graphical display including a sliding bar, selectable icons, etc. For example, the user may be presented with a scale (e.g., a sliding bar) where she can use an input device (e.g., a mouse) to indicate on a sliding bar how much she enjoyed the media asset. The user may also be presented with selectable icons that may represent possible indications for the user to select. For example, she may be presented with a "like" indication and a "dislike" indication. The user may also be presented with a scale where the user may use a keyboard to enter the desired indication. For example, the user can enter a letter "B" based on a scale from "A" to "F."

The control circuitry may then receive second preference information, wherein the second preference information is associated with a second data space, describes preferences of a second plurality of users with respect to a second plurality of media assets, and is computed using a different metric than a metric that the first preference information is computed using, and wherein the second data space is managed by a content provider that does not manage the first data space. For example, both the content provider associated with the first data space and the content provider associated with the second data space may store data indicating a length of time a user spends consuming a media asset before that user switches to another media asset or otherwise stops consuming the media asset. One content provider may store that data as a number of minutes that the user spent consuming the media asset and the second content provider may store that data as a percentage of the media asset that was consumed. It can be said that the two content providers use different metrics for this information.

The control circuitry may further normalize the first preference information and the second preference information such that both the first preference information and the second preference information are converted to a scheme on which a common metric may be applied. To continue with the above example, one content provider may find it useful to store the data indicating a length of time that a user spent consuming a media asset as a number of minutes, while another content provider may find it useful to store the same data as a percentage of the media asset that was consumed. Both of these representations may be useful in order to determine how similar two media assets are, however, the percentage of the media asset consumed may be calculated based on the length of time the user spent consuming the media asset and the total length of the media asset. Conversely, the length of time that the user spent consuming a media asset may be calculated based on the total length of the media asset and the percentage consumed. Therefore, converting these values into one metric would still allow the control circuitry to calculate both values and at the same time store the values uniformly.

The control circuitry may then determine, using the normalized first preference information and the normalized second preference information, a user's level of enjoyment with respect to a media asset based on the common metric, where the first preference information and the second preference information each comprise data describing the user's indicated level of enjoyment of the media asset. For example, the control circuitry may have determined based on the first preference information from the first data space that a user's level of enjoyment of a movie named "Pirates of the Caribbean" is 7 on a scale of 1 to 10 where 10 is the highest level of enjoyment. The control circuitry may have further determined based on the second preference information in the second data space that a user's level of enjoyment of a movie named "The Pirates of the Caribbean" is 6 on a scale of 1 to 10 where 10 is the highest level of enjoyment. The control circuitry may for example average the two values to determine a level of enjoyment in the media asset based on preference information from both data spaces.

The control circuitry may further determine, based on a model, an expected level of enjoyment that the user is expected to have with respect to the media asset. For example, it may be advantageous for a content provider to recommend media assets to users. The content provider may need to determine what media assets to recommend to specific users. These recommendations may be provided based on user's preference information. A model may be used to analyze a particular user's preference information in order to determine a user's expected level of enjoyment with respect to a specific media asset that the content provider may want to recommend to the user. For example, the control circuitry may transmit a media asset identifier associated with "Pirates of the Caribbean" to a model in order for the model to provide a user's expected level of enjoyment for this movie. The control circuitry may alternatively execute programming instructions associated with the model to instruct the model to provide a user's expected level of enjoyment for the movie. The model may determine that "Pirates of the Caribbean" is an action film. Alternatively or additionally, the control circuitry may execute instructions associated with the model to determine that "Pirates of the Caribbean" is an action film. The model or the control circuitry executing instructions associated with the model may determine that the user indicated her level of enjoyment for "Terminator" (another action movie) as a 4 and also watched only a part of another action movie. Based on those determinations the model may return to the control circuitry a value of 3 on the same scale of 1 to 10. Alternatively or additionally, the control circuitry may make the same determination by executing instructions that are associated with the model.

The control circuitry may then determine an error value, wherein the error value is based on a comparison between the level of enjoyment and the expected level of enjoyment. In the example above, the control circuitry may compare the two values and determine that they are different. The control circuitry may then, based on the difference between the user's level of enjoyment and the expected level of enjoyment, determine an error value.

In some embodiments, the control circuitry may normalize the first preference information and the second preference information by generating a record for the media asset, where the record comprises preference information that is retrieved from both the first data space and the second data space, and where the retrieved preference information has been converted to the scheme on which the common metric may be applied. For example, a movie named "Saving Private Ryan" may have user preference information associated with it within the first data space. The same movie may exist in the second data space and also have user preference information associated with it. The control circuitry may determine that entries for "Saving Private Ryan" in both data spaces correspond to the same movie and create one record for both "Saving Private Ryan" movies that will include preference information from both data spaces.

In some embodiments, as part of determining the user's level of enjoyment with respect to the media asset, the control circuitry may first identify metadata associated with the media asset. For example, the control circuitry may access the normalized preference information. Metadata associated with each media asset may be present within the normalized preference information. The control circuitry may identify only the metadata associated with a particular media asset. The control circuitry may further compare the identified metadata associated with the media asset with metadata associated with a second media asset, where the second media asset is from the second plurality of media assets. For example, user preference information for a second media asset may be part of the second preference information within the second data space and have associated metadata. The control circuitry may identify the metadata associated with the second media asset in the same manner as it identifies metadata associated with the first media asset. The control circuitry may then determine whether the metadata of the media asset sufficiently matches the metadata of the second media asset. For example, metadata associated with media assets may be stored as a series of attributes. The metadata may include the title of the media asset, release date of the media asset, actors in the media asset, a description, episode number if a media asset is part of a series, etc. The control circuitry may compare those attributes of the first media asset and the second media asset to determine if enough attributes match. If enough attributes match, the control circuitry determines that the two media assets include identical content. In response to determining that the metadata of the media asset sufficiently matches the metadata of the second media asset, the user's level of enjoyment with respect to the media asset based on the first preference information associated with the first media asset and the second preference information associated with the second media asset. In the example above, each "Saving Private Ryan" movie may have metadata associated with it. The control circuitry may compare the titles and release dates of both movies in order to determine that the content of the movies is the same. Other metadata may be used in order to make the determination.

In some embodiments, as part of determining, using the normalized first preference information and the normalized second preference information, the level of enjoyment that the user has with respect to the media asset, the control circuitry may first calculate a first confidence value in the user's level of enjoyment of the media asset based on the first preference information. The control circuitry may then calculate a second confidence value in the user's level of enjoyment of the media asset based on the second preference information. The control circuitry may further determine a combined confidence value based on the first confidence value and the second confidence value, and adjust the level of enjoyment that the user has with respect to the media asset based on the combined confidence value. For example, the control circuitry may determine that the user's level of enjoyment with respect to a media asset based on a first data space is more accurate than the user's level of enjoyment with respect to the same media asset based on the second data space. In that case, confidence values may be calculated for both levels of enjoyment and the value can be adjusted to be closer to the level of enjoyment with a higher confidence value. If for example, one confidence value in the first data space is 0.9 on a scale of 0 to 1, and the second confidence value is 0.1 on the same scale, the user's level of enjoyment will be much closer to the level of enjoyment value that is based on the preference information from first data space.

In some embodiments, the first confidence value is based on an amount of data associated with the media asset in the first data space. For example, a first data space may include one million users and one million media assets. Out of those one million users, one hundred thousand users may have watched a movie named "Die Hard" and two hundred thousand users may have watched a movie named "The Matrix." The content provider associated with that data space may have stored user preference information for all those users with respect to both "Die Hard" and "The Matrix." A second data space, associated with a second content provider may include only ten thousand users and have only one thousand users that watched "Die Hard" and only five hundred users that watched "The Matrix." The control circuitry may access both data spaces and identify these differences. As a result, the control circuitry may determine that the confidence value in the user's level of enjoyment based on the user preference information in the first data space is higher than that of the user preference information in the second data space.

In some embodiments, the control circuitry may further determine the combined confidence value based on the first confidence value and the second confidence value by the following. The control circuitry may determine a first degree of particularity, where the first degree of particularity is based on the first preference information. The control circuitry may also determine a second degree of particularity, where the second degree of particularity is based on the second preference information. The control circuitry may then calculate a combined particularity value based on the first degree of particularity and the second degree of particularity, and determine the combined confidence value based on the combined particularity value. For example, a scale where the user's level of enjoyment with respect to a media asset is between the values of 1 and 10 has a higher degree of particularity than a scale between one star and five stars and both of those scales have higher degrees of particularity than a "like/dislike" scale.

In some embodiments the control circuitry may determine the combined confidence value based on the combined particularity value by calculating a weighted average of the first degree of particularity and the second degree of particularity. For example, the control circuitry may determine that the first degree of particularity is significantly higher than the second degree of particularity, but the control circuitry may also determine that the second degree of particularity is more accurate based, for example, on the amount of data in a certain data space. As a result, the control circuitry may weigh the lower particularity value higher when calculating a user's level of enjoyment with respect to the media asset.

In some embodiments, the control circuitry may provide the error value and data associated with the error value to the model and update the model based on the error value and the data associated with the error value. For example, the control circuitry may associate the error value with other data that may be used to update the model to be more accurate when calculating the user's level of enjoyment with a respect to a media asset. The control circuitry may transmit the error value and the data to the model in order to improve the model's accuracy.

In some embodiments, the control circuitry may update the model based on the error value and the data associated with the error value by computing a derivative of a composition of both (1) a function used to determine the level of enjoyment that the user has with respect to the media asset and (2) a function to determine the expected level of enjoyment that the user is expected to have with respect to the media asset and update the model based on the computed derivative. For example the composition of the functions to determine a user's level of interest with respect to a media asset may be determined. Once that's done, a derivative of the resulting function may be taken. The model may be updated based on the derivative.

In some embodiments, the control circuitry may update the model based on the computed derivative by determining the model's trainable parameters, where the model's trainable parameters include updatable values used to improve accuracy of the expected level of enjoyment of the user with respect to the media asset and updating the trainable parameters based on the computed derivative. For example, each model may include trainable parameters that when updated increase the accuracy of the model. The results of the comparison between the expected user's level of enjoyment with respect to a media asset and the user's level of enjoyment with respect to the same media asset may be used to update the trainable parameters to improve the expected user's level of enjoyment with respect to a media asset.

In some aspects, the control circuitry may be configured to perform tasks of a consumption model. As referred to herein, the term "consumption model" refers to any software and/or hardware (e.g., control circuitry) with the ability to transform monitored user interactions with respect to media assets and levels of enjoyment input by users with respect to media assets into user preference information for those media assets. For example, a consumption model may take, as input, data that includes information that a user has watched a show in its entirety, that a user watched a number of other shows in the same series and that the user watched three episodes of the series in sequence one after another. The consumption model may take that information and transform that information into data describing the user's preference for that particular show or the particular series. The control circuitry may assign a weight to each piece of that data. The consumption model may later manipulate those weights to determine more accurately the user's preference for the particular show or series.

In some embodiments, the control circuitry may receive first preference information of a first plurality of users. The first preference information may be associated with a first data space and may describe monitored user interactions of the first plurality of users with respect to the first plurality of media assets. The first plurality of media assets may correspond to the first data space. For example, the control circuitry may receive preference information from one content provider. The received preference information may include data describing how different users interacted with different media assets. For example, the control circuitry may determine that the content provider includes information on whether specific users consumed specific media assets, whether each user consumed the entire media asset and if not, what percentage of the media asset the user consumed, the total time of the media asset and the amount of time that the user spent consuming the media asset, etc.

In some embodiments, the control circuitry may receive second preference information of a second plurality of users. The second preference information may be associated with a second data space and may comprise levels of enjoyment that are expressly input by the second plurality of users with respect to the second plurality of media assets. The second plurality of media assets may correspond to the second data space. For example, the control circuitry may receive as part of the second data space users' ratings of media assets that the users have consumed. The ratings may be in the form of a scaled number (e.g., from 1 to 10) and/or they may be in the form of text (e.g., user's review of a media asset). In some embodiments, levels of enjoyment that are expressly input by users may be referred to as "ratings."

In some embodiments, the control circuitry may transform the first preference information to first consumption layer preference information, where the first consumption layer preference information includes specific attributes that are indicative of users' preferences. For example, the control circuitry may determine that a specific user has watched the movie assets "Terminator," "Rambo," and "The Pirates of the Caribbean." The control circuitry may use the consumption model in order to determine, for example, that the user likes action movies. Additionally or alternatively, the control circuitry may determine that the user likes thrillers based on the user watching "Terminator" and "Rambo." The control circuitry may, alternatively or additionally, determine that the user may like action adventure movies based on the user watching "The Pirates of the Caribbean."

In some embodiments, the control circuitry may transform the second preference information to second consumption layer preference information, where the second consumption layer preference information includes specific attributes that are indicative of users' preferences. For example, the control circuitry may determine that a user rated "Terminator" as a 9 on a scale of 1 to 10. The control circuitry may also determine that the user rated "Rambo" and "Pirates of the Caribbean" as an 8. The control circuitry may use the consumption model in order to determine, for example, that the user likes action movies. Further, the control circuitry may determine that the user likes thrillers based on the user ratings of "Terminator" and "Rambo." The control circuitry may, alternatively or additionally, determine that the user may like action adventure movies based on the user's rating of "The Pirates of the Caribbean."

In some embodiments, the control circuitry may be configured to perform tasks of a preference model. As referred to herein, the term "preference model" refers to a configuration of control circuitry that calculates user preference details for media assets based on user attributes indicative of users' preferences. In some embodiments, the control circuitry may determine first user preference details corresponding to a first media asset and a second media asset based on the first consumption layer preference information. For example, using the example above, the control circuitry may determine that the user likes thrillers and action adventure movies based on the user watching "Terminator," "Rambo," and "The Pirates of the Caribbean." Based on that information, the control circuitry may determine that the user is likely to enjoy "Terminator 2" because it is a thriller and "Cutthroat Island" because it is an action adventure film.

In some embodiments, the control circuitry may determine second user preference details corresponding to the first media asset and the second media asset based on the second consumption layer preference information. In the example above, the control circuitry may determine that the user likes thrillers and action adventure movies based on the user's ratings for "Terminator," "Rambo," and "The Pirates of the Caribbean." Based on that information, the control circuitry may determine that the user is likely to enjoy "Terminator 2" because it is a thriller and "Cutthroat Island" because it is an action adventure film.

In some embodiments, the control circuitry may be configured to perform tasks of a similarity model. As referred to herein, the term "similarity model" refers to software and/or hardware (e.g., control circuitry) configured to calculate how similar two media assets are based on user preference information for the two media assets. In some embodiments, the control circuitry may perform tasks of a similarity model, by first determining a first sentimental similarity between a first media asset and a second media asset, wherein the first sentimental similarity corresponds to a degree of similarity between the first media asset and the second media asset based on the first user preference details. In continuing the example above, the control circuitry may use data from the first data space only to determine that the movies "Terminator" and "Rambo" are similar to each other because, for example, the user has watched both films, watched them in their entirety and watched them multiple times. In order to compute a more accurate sentimental similarity, the control circuitry may repeat this process for every user that has watched both movies. As referred to herein, the term "sentimental similarity" refers to a degree of similarity between two media assets based on user preferences information with respect to those media assets. The sentimental similarity value may be expressed as a number between 0 and 1 where 0 indicates a lowest sentimental similarity value and 1 indicates a highest sentimental similarity value.

In some embodiments, the control circuitry may determine a second sentimental similarity between the first media asset and the second media asset based on the received user preference details associated with the second data space. In continuing the example above, the control circuitry may use data from the second data space only to determine that the movies "Terminator" and "Rambo" are similar to each other because the user rated both movies highly. The control circuitry may repeat this process for all the users in the second data space in order to determine more accurately how similar the movies are to each other. For example, a second user may have rated both movies as a 3 on a scale of 1 to 10. This factor may point to a user not liking these two movies and also to the fact that the user may not have liked these two movies because they are similar to each other.

In some embodiments, the control circuitry may be configured to perform tasks of an error model. As referred to herein, the term "error model" refers to software and/or control circuitry that is able to calculate differences in similarity values for a pair of media assets and determine parameters and weights of those parameters used to calculate the similarity values. Additionally or alternatively, an "error model" may able to calculate differences in implicit and explicit user preferences and determine parameters and weights of those parameters used to calculate implicit and explicit preferences. In some embodiments, the control circuitry configured to perform tasks of an error model may determine a difference between the first sentimental similarity and the second sentimental similarity. For example, the control circuitry may take, as input, a first sentimental similarity value that may be 0.4 on a scale of 0 to 1 and a second sentimental similarity value that may be 0.7 on the same scale. The control circuitry may then determine that there is a difference of 0.3 in the value and may also determine the parameters that the values have been based on as well as the weights used in the parameters.

In some embodiments, the error model's determination may be referred to as a pair-wise difference between the first sentimental similarity and the second sentimental similarity. The control circuitry may use the pair-wise difference in order to compute an error value based on the difference. In some embodiments, the control circuitry may adjust, based on the pair-wise difference between the first sentimental similarity and the second sentimental similarity, the first user preference details and the second user preference details determined from the first and second consumption layer preference information in order to minimize the error value.

For example, if the pair-wise difference in the two sentimental similarity values is 0.3, the control circuitry may adjust the weights associated with the first consumption layer preference information in order to adjust the user preference details associated with the first data space in order to minimize the error value. In another example, the control circuitry may adjust the weights associated with the second consumption layer preference information in order to adjust the user preference details associated with the second data space in order to minimize the error value. In some embodiments, the control circuitry may adjust the weights associated with both first and second consumption layer preference information in order to minimize the error value.

In some embodiments, the control circuitry may adjust the user preference details, based on the difference between the first sentimental similarity and the second sentimental similarity, by applying a chain rule in order to determine weights of trainable parameters of the preference model. For example, the control circuitry may determine new weights of the trainable parameters in order to minimize the error value.

In some embodiments, the control circuitry may determine the user preference details corresponding to the given media asset based on the consumption layer preference information, and may apply one of a linear transformation function, a neural network, and a restricted Boltzmann machine. For example, the control circuitry may be configured to implement a linear transformation function. The control circuitry may also be configured to implement a neural network and a restricted Boltzmann machine.

In some embodiments, the control circuitry, when computing the first sentimental similarity between the first media asset and the second media asset based on the received user preference details associated with the first data space, may apply one of a Pearson's coefficient and a cosine similarity. For example, the control circuitry may be configured to implement Pearson's coefficient and/or cosine similarity.

In some embodiments, the control circuitry may calculate the difference between the first and the second sentimental similarity based on quality values. As referred to herein, the term "quality value" refers to a value that indicates the degree of reliability of the different sentimental similarity values. For example, the control circuitry may calculate a sentimental similarity value from data in one data space to be of greater quality than from a second data space because the first data space has more data associated with the two media assets being compared and therefore, may contain more accurate information. In another example, the control circuitry may determine that one sentimental similarity value is of a greater quality based on the number of interactions that are tracked in the data space. In yet another example, the quality value associated with a sentimental similarity may be based on a number of users who have expressly input their level of enjoyment with respect to the two media assets. For example, if one data space only includes information based on monitoring whether users watched a specific movie and another data space includes information on whether the user watched a movie, what part of the movies the user watched, and if the user watched any other movie in the same sitting, the control circuitry may assign a higher quality value to the second data space.

In some embodiments, in order to calculate the difference between the first and second sentimental similarity values, the control circuitry may calculate a first quality value that is associated with the first sentimental similarity. The control circuitry may then calculate a second quality value that is associated with the second sentimental similarity. For example, the control circuitry may calculate both quality values based on the respective data spaces of the first sentimental similarity and the second sentimental similarity. The control circuitry may use quantity of users, quantity of media assets, amount of information, etc. in the calculations. The control circuitry may then determine the difference between the first sentimental similarity and the second sentimental similarity based on the first quality value and the second quality value.

In some embodiments, the control circuitry may determine the first quality value based on a number of users from the first data space who consumed the first media asset. For example, if five users from a first data space consumed a media asset and five hundred users, from the second data space, consumed the media asset, the control circuitry may determine that the information of the second data space is of better quality.

In some embodiments, the control circuitry, may calculate the difference between the first sentimental similarity and the second sentimental similarity based on a particularity of the first preference information and the second preference information. Particularity of preference information and its definition is described above. In some embodiments, the control circuitry may determine a particularity of the first preference information and also determine a particularity of the second preference information. For example, the control circuitry may determine that data from the first data space is more particular because the data in the first data space is based on 18 types of user interactions with respect to media assets and the second data space has only 3 types of user interactions with respect to media assets. Thus, the control circuitry may determine that the first sentimental similarity value is more particular and, as such, more accurate. In some embodiments, as described above, the control circuitry may base particularity values on the granularity of a scale of users' level of enjoyment with respect to media assets. For example, a scale of one to ten is more particular than a like/dislike scale. A scale of one percent to one hundred percent is more particular than a scale between numbers one and ten.

In some embodiments, the control circuitry may, when transforming the first preference information and the second preference information to a consumption layer preference information, determine, for the first media asset of the first plurality of media assets, whether the first media asset is also within the second plurality of media assets. In response to determining that the first media asset is also within the second plurality of media assets, the control circuitry may generate a record for the first media asset, wherein the record comprises preference information that is retrieved from both the first data space and the second data space. The control circuitry may perform these actions by utilizing metadata from the respective dataspaces. Metadata may include the title of the media asset, year released, genre of the movie, director(s), writer(s), actors, and a description. For example, the control circuitry may determine that a movie from the first plurality of media assets and a movie from the second plurality of media assets include metadata associated with the respective movies. The control circuitry may compare the titles and release dates of both movies in order to determine that the content of the movies is the same.

In some aspects, control circuitry may process media consumption information across multiple data sets over a common media asset space. As described above, the control circuitry may be configured to perform tasks of a consumption model.

In some embodiments, the control circuitry configured to perform tasks of a consumption model, may receive preference information of a plurality of users, where the preference information is associated with a data space. The preference information may describe both (1) monitored user interactions of the plurality of users with respect to the plurality of media assets and (2) levels of enjoyment that are expressly input by the plurality of users with respect to the plurality of media assets. For example, as described above, the control circuitry may receive the user's level of enjoyment with respect to a media asset as a scaled value between one and ten. Examples of monitored user interactions with media assets are described above as well.

In some embodiments, the control circuitry may transform the preference information to consumption layer preference information, where the consumption layer preference information comprises attributes that are indicative of users' preferences. For example, the control circuitry may determine that preference information is in the form of monitored user interactions of the plurality of users with respect to the plurality of media assets. The control circuitry may then determine that a specific user has watched "Terminator," "Rambo," and "The Pirates of the Caribbean." The control circuitry may use the consumption model in order to determine, for example, that the user likes action movies. Additionally or alternatively, the control circuitry may determine that the user likes thrillers based on the user watching "Terminator" and "Rambo." The control circuitry may, alternatively or additionally, determine that the user may like action adventure movies based on the user watching "The Pirates of the Caribbean." Alternatively or additionally, the control circuitry may determine that preference information is in the form of levels of enjoyment that are expressly input by the plurality of users with respect to the plurality of media assets. The control circuitry may then determine that a user rated "Terminator" as a 9 on a scale of 1 to 10. The control circuitry may also determine that the user rated "Rambo" and "Pirates of the Caribbean" as an 8. The control circuitry may be configured to perform tasks of a consumption model in order to determine, for example, that the user likes action movies. Additionally or alternatively, the control circuitry may determine that the user likes thrillers based on the user ratings of "Terminator" and "Rambo." The control circuitry may, alternatively or additionally, determine that the user may like action adventure movies based on the user's rating of "The Pirates of the Caribbean."

In some embodiments, the control circuitry may determine user preference details corresponding to a given media asset based on the consumption layer preference information. For example, the control circuitry may determine based on information about monitored user interactions of all users in the data space with "Terminator" that three quarters of the users within the data space watched the movie, that a large percentage of those users who watched the movie watched all of it and also watched "Terminator 2." Additionally or alternatively, the control circuitry may determine that three quarters of the users in the data space indicated their level of enjoyment with respect to "Terminator."

In some embodiments, the control circuitry may determine an estimated implicit user preference for a media asset. The estimated implicit user preference for a media asset may be based on the consumption layer preference information associated with monitored user interactions of the plurality of users with respect to the media asset. As referred to herein, the term "estimated implicit user preference" refers to a user preference with respect to a media asset that is estimated based on monitored user interactions with that media asset. For example, the control circuitry may determine, based on three quarters of the users within the data space watching "Terminator," a large percentage of those users watching the full movie and also watching "Terminator 2", that "Terminator" that an estimated implicit user preference for "Terminator" over the data space would correspond to an 8 on a scale of 1 to 10.

In some embodiments, the control circuitry may determine an estimated explicit user preference for a media asset. The estimated explicit user preference may be based on the consumption layer preference information associated with levels of enjoyment that are input by the plurality of users with respect to the media asset. For example, the control circuitry may determine an overall level of enjoyment with respect to "Terminator," based on, for example, whether specific users liked the movie based on those user's ratings of the movie (e.g., like/dislike, scaled values, reviews, etc.). For example, the control circuitry may determine that, based on the above information, the explicit user preference for "Terminator" is 6 on a scale of 1 to 10.

In some embodiments, the control circuitry may be configured to perform tasks of an error model. The control circuitry may determine a difference between the first sentimental similarity and the second sentimental similarity. For example, the control circuitry may take, as input, a first sentimental similarity value that may be 0.4 on a scale of 0 to 1 and a second sentimental similarity value that may be 0.7 on the same scale. The control circuitry may then determine that there is a difference of 0.3 in the value and may also determine the parameters that the values have been based on as well as the weights of those parameters.

In some embodiments, the control circuitry may determine an error value based on the comparing. For example, the control circuitry may determine an error value based on the difference of 0.3 between the estimated implicit user preference and the estimated explicit user preference. In some embodiments, the control circuitry may calculate an error value as a percentage difference between the two values that were compared.

In some embodiments, the control circuitry may adjust, based on the error value, the user preference details in order to minimize the error value. For example, the control circuitry may determine that certain user preference details are given more weight than other user preference details. The control circuitry may adjust weights assigned to the user preference details in order for the estimated implicit user preference and the estimated explicit user preference to come as close as possible to converging.

In some embodiments, when adjusting, based on the error value, the user preference details, the control circuitry may apply a chain rule in order to update trainable parameters of the preference model. For example, the control circuitry may determine that the estimated explicit preference and the estimated implicit preference are associated with specific mathematic functions. The control circuitry may then take a derivative of the composition of the two functions.

In some embodiments, the trainable parameters comprise updatable values. For example, the control circuitry may determine that each trainable parameter is associated with a specific weight that may be updated in order to improve the degree of accuracy of the estimated implicit user preference and the estimated explicit user preference.

In some embodiments, the control circuitry may, when determining the user preference details corresponding to the given media asset based on the consumption layer preference information, apply one of a linear transformation function, a neural network, and a Boltzmann machine. For example, the control circuitry may be configured to implement a linear transformation function. The control circuitry may also be configured to implement a neural network and a restricted Boltzmann machine.

In some embodiments, the control circuitry configured to perform tasks of an error model may, when comparing the estimated implicit user preference with the estimated explicit user preference, calculate a first quality value, where the first quality value is associated with the monitored user interactions of the plurality of users with respect to the plurality of media assets. Alternatively or additionally, the control circuitry may calculate a second quality value, where the second quality value is associated with levels of enjoyment that are expressly input by the plurality of users with respect to the plurality of media assets. The control circuitry may then adjust the user preference details associated with the lower quality value. For example, the control circuitry may determine that the estimated explicit user preference corresponds to user preference details that are of a higher quality value than the user preference details associated with the estimated implicit user preference. Based on that determination the control circuitry may adjust the values of the weights corresponding to monitored user interactions in order to minimize the error value.

In some embodiments, the control circuitry may determine the first quality value based on a number of users that consumed the media asset. For example, if the control circuitry determines that the first quality value is associated with monitored user interactions with respect to media assets, the control circuitry may assign a high quality value if a large percentage of users within a data space consumed a media asset and a low quality value if a small percentage of users consumed with a data space consumed the media asset.

In some embodiments, the control circuitry may determine the second quality value based on a number of users who indicated a level of enjoyment with respect to the media asset. For example, if the control circuitry determines that the second quality value is associated with levels of enjoyment that are expressly input by a plurality of users with respect to a plurality of media assets, the control circuitry may assign a high quality value if a large percentage of users within a data space indicated their level of enjoyment for a media asset and a low quality value if a small percentage of users indicated their level of enjoyment with respect to the media asset.

In some embodiments, the control circuitry may determine the first quality value based on a particularity of the monitored user interactions of the plurality of users with respect to the plurality of media assets. For example, if the first quality value is associated with monitored user interactions, the control circuitry may assign a high quality value if a data space includes a large number of different parameters that have been monitored. The control circuitry may assign a low quality value if a data space includes a small number of different parameters that have been monitored.

In some embodiments, the control circuitry may determine the second quality value based on a particularity of the levels of enjoyment that are expressly input by the plurality of users with respect to the plurality of media assets. For example, if the data space includes user level of enjoyment data on a scale between 1 and 100 and also includes user's reviews of media assets, the control circuitry may assign a high value to the second quality value. However, if the data space includes user level of enjoyment data that just indicates like/dislike, the control circuitry may assign a low value to the second quality value.

It should be noted that the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
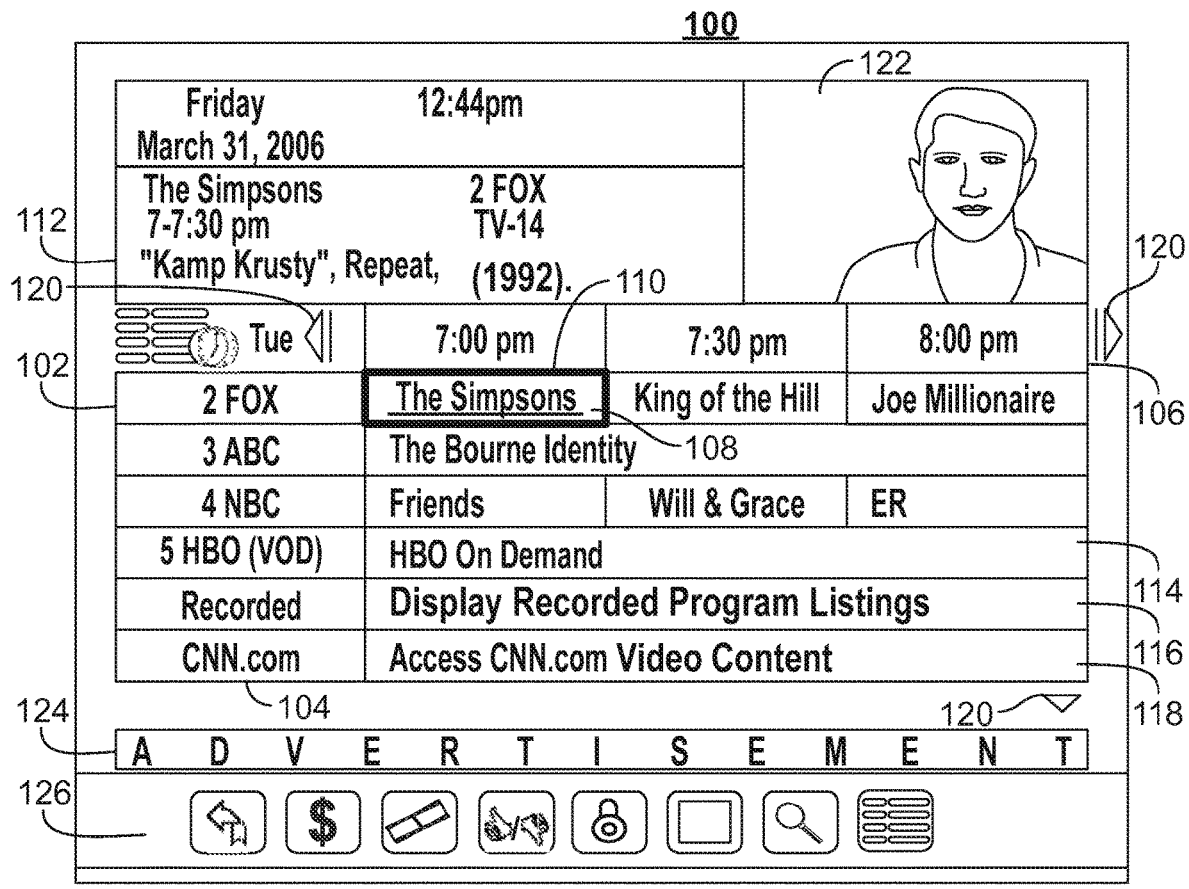
FIGS. 1 and 2 show illustrative display screens that may be used to provide media guidance application listings in accordance with an embodiment of the disclosure.

Accordingly, systems and methods for determining error values for traditional training models based on user preference information from multiple data spaces are described.

For example, it may be advantageous for a cable television provider (e.g., Comcast®) to recommend a movie to a user. One way to provide a recommendation to the user is to determine which movies the user prefers and what about those movies she prefers. This may be accomplished in at least two ways. A model may be used to determine which movies are similar to other movies, in what way and to what degree based on user preference information with respect to those movies. For example, a user may have watched the movie "Terminator". The model may have retrieved from the user preference information that the user watched the movie twice, watched it entirely, rewound the movie to watch specific scenes twice and rated a movie as 9 on scaled of 1 to 10. The model may determine based on those facts that the user likes "Terminator" a great deal. The model may then find another movie similar to "Terminator" to recommend to the user. Various ways to determine which movies are similar to each other are found in, for example, U.S. patent application Ser. No. 14/578,911, filed on Dec. 22, 2014, which is hereby incorporated by reference herein in its entirety.

Another way to provide a recommendation to a user is to determine, using a recommendation model, the user's expected level of enjoyment with respect to a specific media asset based on the user's level of enjoyment of other media assets. A model may be used to determine the user's expected level of enjoyment with respect to a media asset based on the user's preference information with respect to other media assets.

In both instances, it would be useful to provide recommendation models that may be trained to provide better accuracy of recommendations. This may be accomplished through the use of trainable parameters. Parameter values of a recommendation that is determined by the model may be compared to more accurate values derived from multiple data spaces. An error value may be found based on the comparisons and later trainable parameters may be adjusted to minimize the error value.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
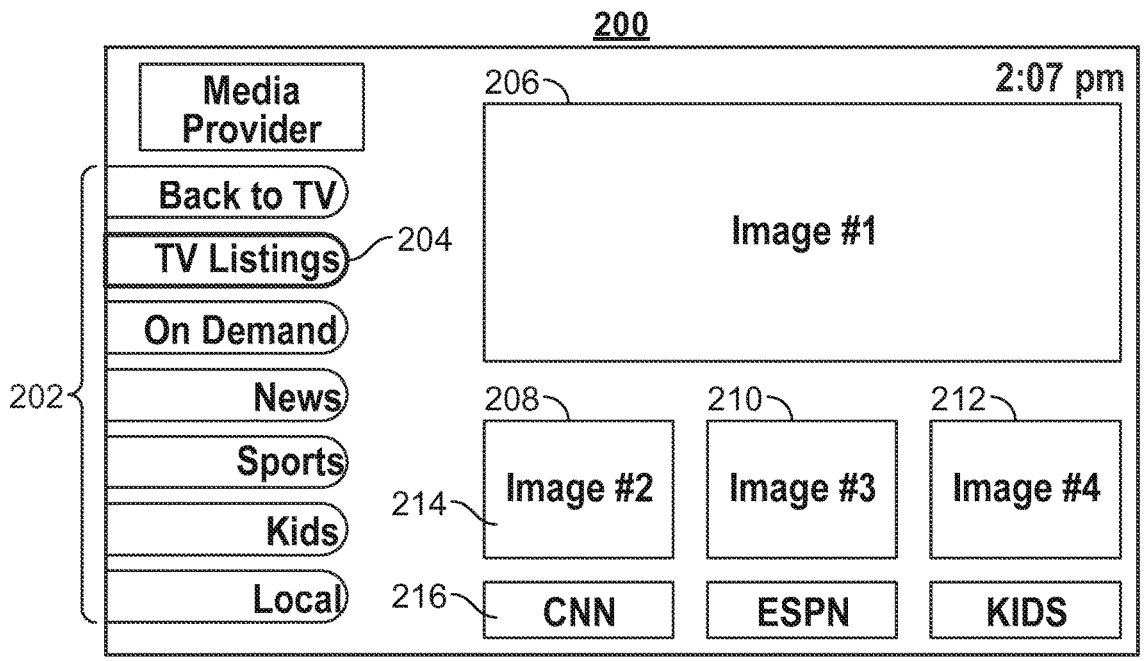

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
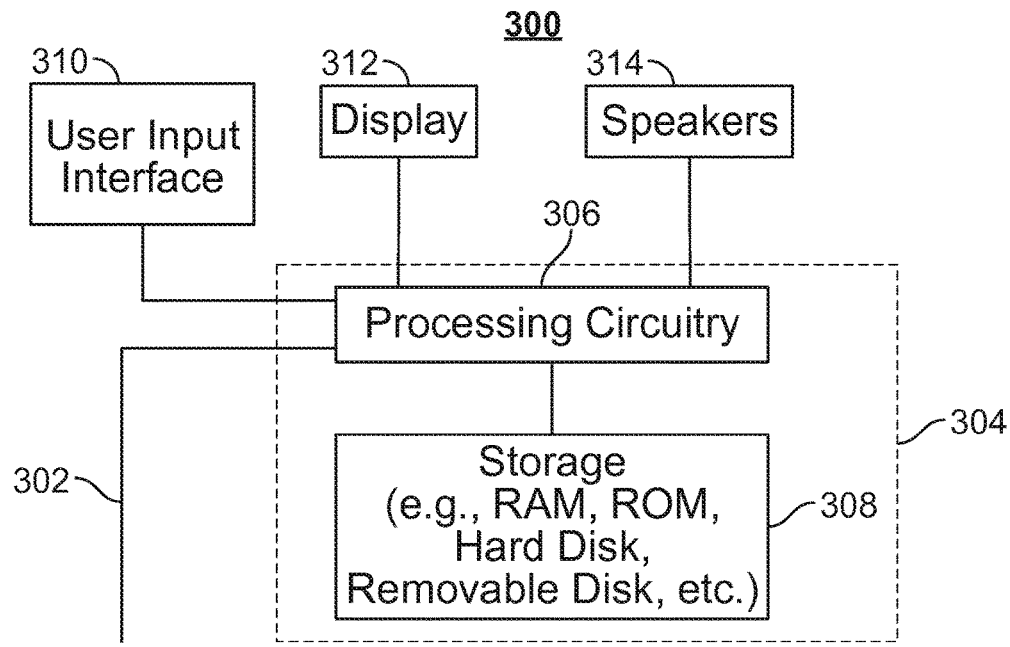
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
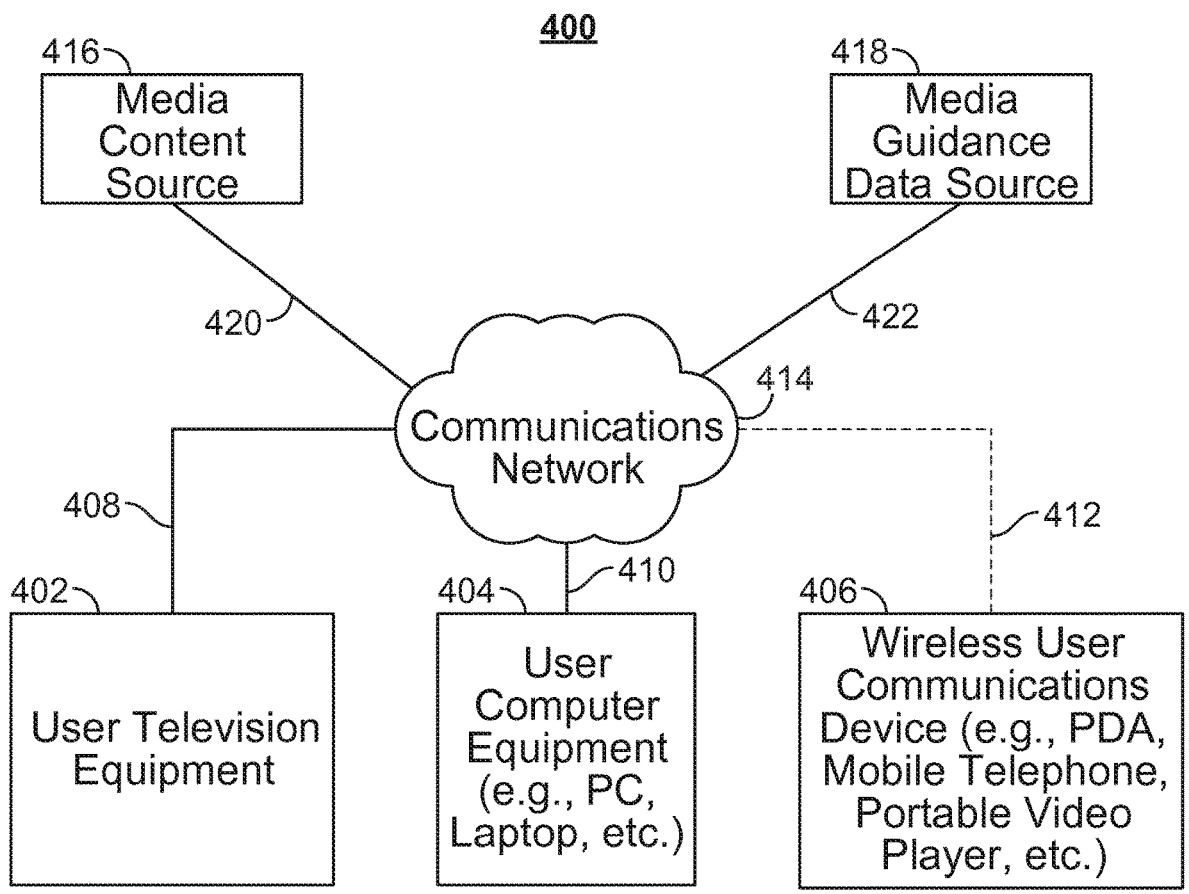
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Control circuitry (e.g., control circuitry 304) may be configured to determine an error value based on comparing an expected media asset similarity value corresponding to a first media asset and a second media asset, as determined using a model, to a media asset similarity value determined from user preference information associated with multiple data spaces.

In some embodiments, control circuitry 304 determines the error value by first receiving first preference information of a first plurality of users, wherein the first preference information is associated with a first data space and describes preferences of the first plurality of users with respect to a first plurality of media assets. For example, a content provider such as Netflix® may store user preference information. User preference information with respect to media assets that are provided by Netflix® may be stored in a database. The database may be stored at the media guidance data source 418 (FIG. 4) and may be accessed via communications network 414 (FIG. 4). The database may also be stored in storage 308 (FIG. 3). Alternatively or additionally, parts of the database may be stored in both storage 308 (FIG. 3) and media guidance data source 418 (FIG. 4). We may refer to this set of data within the database as the first data space. The media guidance application may gain access to the first data space via different methods. For example, a content provider such as Netflix® may provide a file transfer protocol ("FTP") site that would allow for downloading the user preference information within the Netflix® data space. The preference information may be stripped of all user identifying data and user identification numbers may be assigned to each user. Additionally or alternatively, the preference information may be downloaded by crawling the Internet with a special application in order to retrieve the user preference information. The complete data space may also be spread over several files that may need to be merged in order to access the complete data space.

In some embodiments, control circuitry 304 may receive second preference information, where the second preference information is associated with a second data space, describes preferences of a second plurality of users with respect to a second plurality of media assets, and is computed using a different metric than a metric that the first preference information is computed using and where the second data space is managed by a content provider that does not manage the first data space. A content provider like Hulu® may also have its own user preference information. That preference information may be obtained in the same manner as the first preference information.

Figure 5:
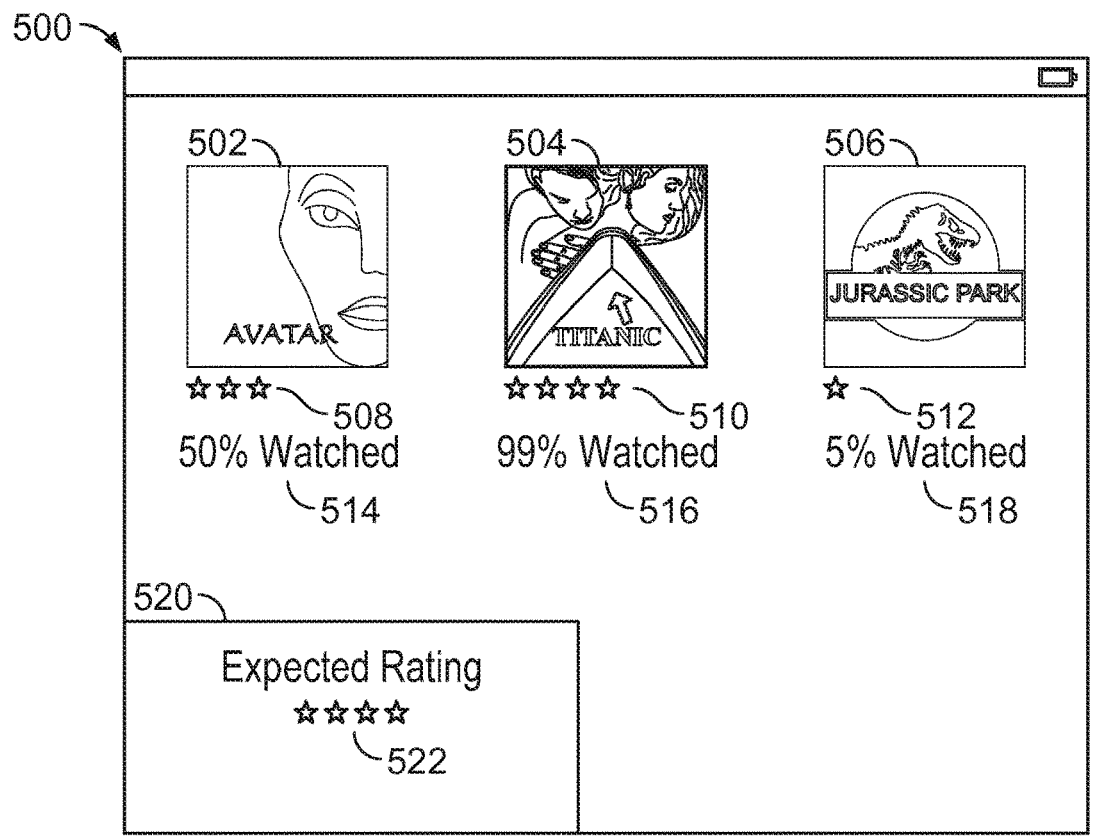
FIG. 5 shows an illustrative embodiment of a two display screens that illustrate user preference information from multiple data spaces, in accordance with some embodiments of this disclosure.
Figure 5:
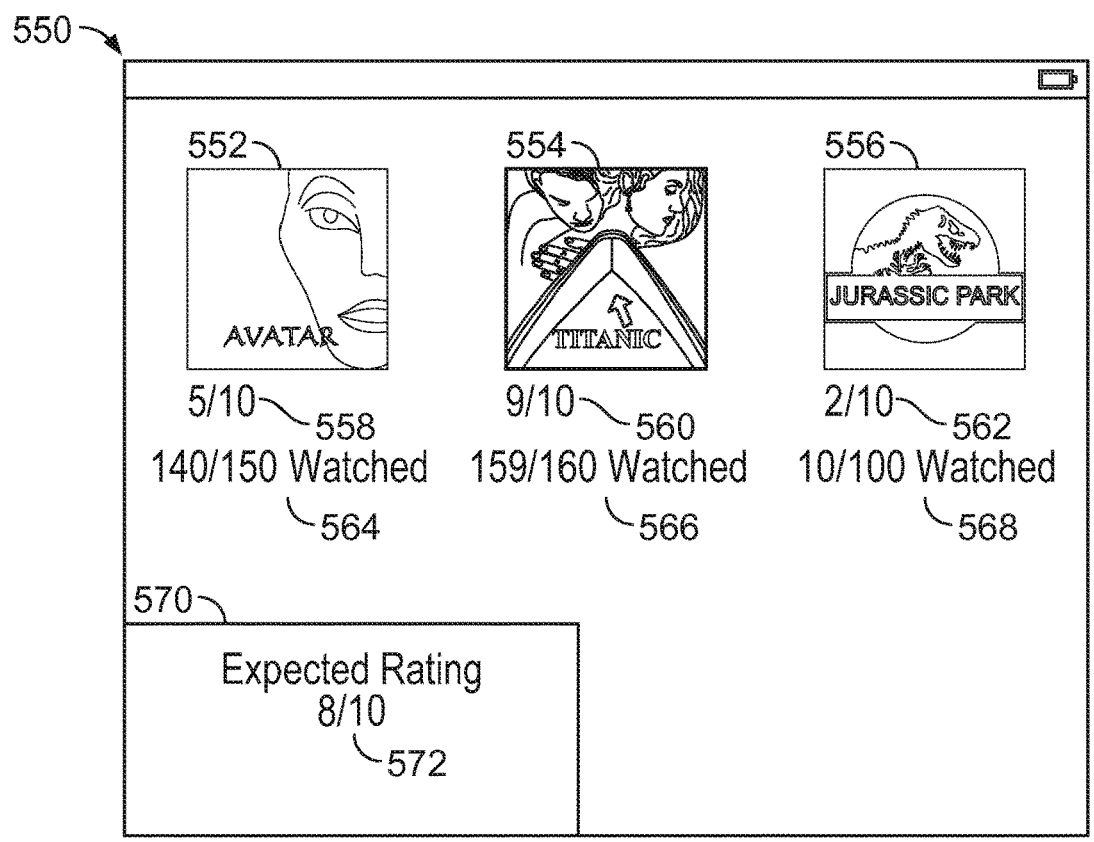

FIG. 5 illustrates user preference information from multiple data spaces. User equipment 500 and user equipment 550 illustrate possible displays of an electronic tablet device. Use equipment 500 and user equipment 550 may have any capabilities of any of user television equipment 402 (FIG. 4), user computer equipment 404 (FIG. 4) and wireless user communications device 406 (FIG. 4). Control circuitry 304 generates for display pictographs 502, 504, and 506 which represent media assets in a first data space. Control circuitry 304 on the same user equipment or different user equipment also generates pictographs 552, 554, and 556 which represent media assets in a second data space. Respective control circuitry 304 generates for display pictographs 502 and 552 to represent the same media asset. Respective control circuitry 304 also generates for display pictographs 504 and 554 and pictographs 506 and 556 also represent the same media asset respectively. Control circuitry 304 generates for display items 508, 510 and 512 to represent users' level of enjoyment for respective media assets in the first data space. As referred to herein, the term "item" refers to a portion of a drawing that is identified by a number. An indicated user's level of enjoyment with respect to a media asset may be referred to herein as a "rating". As referred to herein, the term "rating" refers to a classification or ranking of a media asset. Ratings may include a user indicating whether she likes or dislikes a media asset. Ratings may also include a numeric scale from which a user may choose a value. Ratings may also include indications of a user's mood while the user is consuming a media asset. It should be noted that items 508, 510, and 512 are represented as "star ratings" and are scaled from one star to five stars. However, control circuitry 304 may generate for display a representation of a user's level of enjoyment with respect to a media asset using any type of an indication (e.g., like/dislike, numerical scale, letter indications, etc.). Control circuitry 304 may receive ratings via user input interface 310. Control circuitry 304 may generate for display items 508, 510, 512, 558, 560, and 563 to represent an average rating that the users of the first data space gave to the respective media asset. In another embodiment, these ratings may represent a determination made by control circuitry 304 of a users' level of enjoyment with respect to the media asset based on interactions of the users of the first data space with respective media assets. In yet another embodiment, control circuitry 304 may generate for display the star ratings to represent a combination of the determination of the users' level of enjoyment with respect to the media asset and users' ratings.

In some embodiments, control circuitry 304 generates for display items 558, 560, and 562 in order to provide a representation of users' level of enjoyment for respective media assets in the second data space. For example, control circuitry 304 may generate for display item 558 by using the string "5/10," which indicates that users who consumed the media asset "Avatar," which corresponds to pictograph 552, deemed their enjoyment level with respect to "Avatar" to be average. Control circuitry 304 may generate for display item 560 by using the string "9/10," which indicates that users who consumed the media asset "Titanic," which corresponds to pictograph 554, deemed their enjoyment level with respect to "Titanic" to be excellent. Items 558, 560, and 562 may represent the same preference information as items 508, 510, and 512. It should be noted that items 558, 560, and 562 are represented as numerical ratings and are scaled from 1 to 10. The star ratings scale represents one metric and the numerical ratings scale represents a second metric. Control circuitry 304 may display items 502, 504, 506, 508, 510, 512, 514, 516, 518, 520, 522 via display 312, but may alternatively or additionally read out these items via speakers 314. Control circuitry 304 may access any items in displays 500 and 550 from different content providers via network 414 (FIG. 4) or the same content provider. Alternatively or additionally, control circuitry 304 may access any items in displays 500 and 550 from the media guidance data source 418 or media guidance content source 416. In some embodiments, the control circuitry may access an Internet location where multiple content providers may transmit their respective user preference information. User preference information may be stripped of all user-identifying data and instead each user may be assigned a user identifier that represents the user in the specific data space.

In some embodiments, control circuitry 304 generates for display items 514, 516, and 518 which represent an average percentage of each respective media asset that the users in the first data space have watched. For example, if control circuitry 304 determines that one thousand users have watched the movie "Titanic" and five hundred of those users watched the movie completely and another five hundred of them watched 98% of the movie, control circuitry 304 will calculate the percentage watched by the media guidance application to be 99%. Similarly, control circuitry 304 generates for display items 564, 566, and 568 in display 550 to represent the amount of time that an average user watched the respective movies together with the total time of the movie. For example, control circuitry 304 determines that an average user watched "Avatar" for 140 minutes out of 150 minutes.

In some embodiments, control circuitry 304 may normalize the first preference information and the second preference information such that both the first preference information and the second preference information are converted to a scheme on which a common metric may be applied. Control circuitry 304 may convert the star ratings 508, 510, and 512 in display 550 as well as numerical ratings 558, 560, and 562 to one metric. For example, control circuitry 304 may access each data space and determine what kinds of preference information exist within each data space. As referred to herein, the term "kind of preference information" refers to user preference information items as listed in the definition of user preference information. User preference information may come in various forms. For example, binary information may be part of user preference information (e.g., whether the user consumed a media asset). User preference information may also be more detailed information (e.g., the length of time that the user spent consuming a media asset). Control circuitry 304 may determine whether user preference information from the first data space is compatible with user preference information from a second data space. Control circuitry 304 may then determine whether it can apply the same metric to the corresponding kinds of preference information within the two data spaces. If control circuitry 304 determines that the same metric may be applied, it merges the two kinds of preference information. If control circuitry 304 determines that it cannot apply the same metric to both kinds of preference information, it executes an algorithm against the two kinds of preference information that converts the two kinds of preference information into preference information that a common metric can be applied to. For example, control circuitry 304 may convert both ratings to a scale of 1 to 100 in order to accommodate other scales which may be more particular than the two scales involved here. For example, a scale of 1 to 10 is less particular than a scale of 1 to 20. The percentage watched items 508, 510, and 512 may be normalized with the time watched values 564, 566, and 568.

Once control circuitry 304 determines that the first preference information and the second preference information have been normalized, control circuitry 304 marks the first preference information and the second preference information as ready for use in determining media asset recommendations. For example, control circuitry 304 may mark the first preference information and the second preference information as ready for use by updating a database entry with a binary flag that indicates that the user preference information has been normalized. If user preference information is located within a file, control circuitry 304 may mark the file as ready for use by updating metadata associated with the file.

In some embodiments, control circuitry 304 may determine, using the normalized first preference information and the normalized second preference information, an indication of similarity between a first media asset and a second media asset, where the first preference information and the second preference information each comprise preference data corresponding to the first media asset and the second media asset. For example, control circuitry 304 may select a media asset that is determined to be present in both the first data space and the second data space. Control circuitry 304 may then retrieve the normalized first and second preference information that is associated with the selected media asset. Control circuitry 304 may then select a second media asset and retrieve normalized preference information associated with the second media asset. Control circuitry 304 may compare the normalized preference information in order to determine how similar the two media assets are. For example, control circuitry 304 may determine how similar the two media assets are by way of Pearson's correlation coefficient as described in U.S. Pat. No. 8,572,017 issued Oct. 29, 2013 which is hereby incorporated by reference herein in its entirety. Control circuitry 304 may then store an indication of similarity between the two media assets.

In some embodiments, control circuitry 304 may compare the indication of similarity to an expected media asset similarity value. Control circuitry 304 may first determine the location of the model. The model may be located on any of user equipment 402, 404, or 406. The model may also be located at media guidance data source 418 or media guidance content source 416. Components of the model may also be located at any of the above mentioned locations (e.g., the model may be split among the devices). Control circuitry 304 may transmit to the model media asset identifiers associated with the two media assets that the model is to analyze and determine the expected indication of similarity for. Control circuitry 304 may then receive the expected indication of similarity from the model. Control circuitry 304 may determine an indication of similarity value of the two media assets using the normalized preference information. Once control circuitry 304 receives the expected indication of similarity and determines the indication of similarity, control circuitry 304 compares the two values.

In some embodiments, control circuitry 304 may determine an error value based on the comparison of the two values. Control circuitry 304 may identify data associated with the comparison. Control circuitry 304 may calculate an error value for every pair of media assets within the normalized preference information. The calculation may be represented by the following equation:

$$E1 = \sum_{d=1}^{Dimplicit} \sum_{i=1}^{N} \sum_{j=1}^{N} (XSim(i, j) - ISim(i, j, d))^2 \quad \text{Equation 1}$$

where the parameters of Equation 1 are defined as follows:
E1 error value as discussed above
$D_{implicit}$ number of data spaces including user preference information in the form of user interactions with media assets
i,j media asset identifiers 1 to N
N number of media assets over all data spaces
d data space identifier (e.g., Netflix®, Hulu®)
XSim(i,j) media asset similarity based on indicated user's level of enjoyment
ISim(i,j,d) media asset similarity based on user interactions with respect to media assets In some embodiments, control circuitry 304 determines media asset similarity based on indicated user's level of enjoyment. The calculation may be represented by the following equation:

$$XSim(i, j) = \frac{1}{Dexplicit} \sum_{d=1}^{Dexplicit} RateSim(i, j, d) \quad \text{Equation 2}$$

where the parameters of Equation 2 are defined as follows:
$D_{explicit}$ number of data spaces that include user preference information in the form of indications of users' level of enjoyment of media assets
RateSim(i,j,d) similarity between two media assets based on indications of users' level of enjoyment of media assets In some embodiments, control circuitry 304 may, in the process of normalizing the first media information and the second media information, create a record for each media asset that exists in the first data space and the second data space. Control circuitry 304 may store the record in storage 308, media guidance data source 418 or media guidance content source 316. If control circuitry 304 stores the record in media guidance data source 418 or media guidance content source 316, control circuitry 304 may access the record via communications network 314. Control circuitry 304 may use metadata associated with media assets in order to determine whether two media assets from the first data space and the second data space respectively contain the same content. Control circuitry 304 may retrieve metadata associated with each media asset from the respective data space. Control circuitry 304 may then map the retrieved metadata so it may compare the matching attributes. Control circuitry 304 may then compare the attributes of the two sets of metadata. Control circuitry may use a heuristic algorithm in order to adjust for metadata inaccuracies. For example, if the two titles do not match perfectly, control circuitry 304 may use a threshold value to still determine that the titles match. For example, if one of the titles as stored in the metadata has a period after the characters of the title and the other title is stored in quotation marks, control circuitry 304 may determine by using a heuristic algorithm that a certain percentage of the title matches. Control circuitry 304 may then retrieve the threshold value from storage 308 and compare the two values. If the percentage matched reaches the threshold value, control circuitry 304 may determine that the titles match. In some embodiments, if control circuitry 304 matches a specific set of parameters, no further matches may be needed. For example, if control circuitry 304 matches both the title of the movie and the release date, no other parameters may need to be matched because there is an extremely low chance that two movies with the same name would be released on the same day. Conversely, if control circuitry 304 matches only the title of the movie and not the release date, other parameters must be matched in order to determine that content of the media assets is the same. If the metadata of the first media asset and the second media asset sufficiently match, control circuitry 304 may create one record for the two media assets and add to the record user preference information from multiple data spaces associated with those media assets. For example, a movie may include a title and a release date as part of metadata associated with it. Control circuitry 304 may compare two media assets and if both the title and release date match, the media guidance application may create a record for the movie and add user preference information from both data spaces to the record. In other embodiments, the matching criteria may be tightened or relaxed. For example, if control circuitry 304 determines that a release date is not available, other metadata may have to be used (e.g., genre, length, description, etc.). In some embodiments, control circuitry 304 may create one record only if all of those attributes match. In other embodiments, control circuitry 304 will need to match only one or more attributes in order to create one record for the two selected media assets. Control circuitry 304 may add user preference information to the record that includes data describing interactions of the first plurality of users with the first media asset or data describing indications of a level of enjoyment of the first media asset provided by the first plurality of users. In some embodiments, control circuitry 304 may add both data describing interactions of the first plurality of users with the first media asset and data describing indications of a level of enjoyment of the first media asset by the first plurality of users to the record.

In some embodiments, control circuitry 304 may add to the record both data describing interactions of the first plurality of users with the first media asset and data describing indications of a level of enjoyment of the first media asset provided by the first plurality of users. For example, control circuitry 304 may determine that one data space includes only data describing users' interactions with respect to media assets and does not include users' indicated level of enjoyment with respect to media assets. Control circuitry 304 may determine that a second data space includes users' indicated level of enjoyment with respect to media assets, but not data describing users' interactions with respect to media assets. Control circuitry 304 may include both users' indicated level of enjoyment with respect to a media asset and data describing users' interactions with respect to the media asset in the record. For example, control circuitry 304 may determine that the first data space includes only user's ratings with respect to media assets and the second data space includes only data associated with user interactions. Control circuitry 304 may aggregate both ratings and data describing user interactions into the same record.

In some embodiments, control circuitry 304 may determine, using the normalized first preference information and the normalized second preference information, the indication of similarity between the first media asset and the second media asset. For example, control circuitry 304 may calculate a first confidence value in the indication of similarity between the first media asset and the second media asset based on the first preference information by determining an amount of data the first data space has that is associated with the two media assets. Similarly, control circuitry 304 may calculate a second confidence value in the indication of similarity between the first media asset and the second media asset based on the second preference information by determining the amount of data the second data space has that is associated with the two media assets. Control circuitry 304 may then determine an average confidence value based on the first confidence value and the second confidence value by adding the two values and dividing the result by two. Control circuitry 304 may then adjust the indication of similarity between the first media asset and the second media asset based on the determined average confidence value by applying the confidence value to Equation 1. Control circuitry 304 may apply the confidence value to Equation 1 by increasing the weight of the indication of similarity value corresponding to a data space with a higher confidence value. Control circuitry 304 may, alternatively or additionally, decrease the weight of indication of similarity value corresponding to a data space with a lower confidence value. For example, control circuitry 304 may determine that one data space contains one hundred thousand user interactions with a first media asset and two hundred thousand interactions with a second media asset, and may determine that a second data space contains only one thousand interactions with the first media asset and two thousand interactions with a second media asset. As a result, control circuitry 304 may calculate a confidence value in the indication of similarity between the first media asset and the second media asset that is much greater for the first data space than the second data space. A confidence value calculation may be worked into Equation 1 to determine the error value as follows:

$$E1 = \sum_{d=1}^{D_{implicit}} \sum_{i=1}^{N} \sum_{j=1}^{N} Cij(d)(XSim(i,j) - ISim(i,j,d))^2 \quad \text{Equation 3}$$

where the parameters of Equation 3 are defined as follows:
E1 error value as discussed above $D_{implicit}$ number of data spaces including user preference information in the form of user interactions with media assets i,j media asset identifiers 1 to N N number of media assets over all data spaces d data space identifier (e.g., Netflix®, Hulu®)

XSim(i,j) media asset similarity based on indicated user's level of enjoyment

ISim(i,j,d) media asset similarity based on user interactions with respect to media assets Cij(d) confidence in media asset similarity based on indicated users' level of enjoyment In some embodiments, control circuitry 304 may determine a particularity of the first preference information by analyzing the first data space and determining the number of possible levels of enjoyment a user can select with respect to a media asset. Control circuitry 304 may determine a particularity of the second preference information in the same way as control circuitry 304 determines particularity value of the first preference information, however, control circuitry 304 accesses the second data space for the information. Control circuitry 304 may calculate an average particularity value based on the particularity value of the first preference information and the particularity value of the second preference information by a standard mathematical average formula. Control circuitry 304 determines the average confidence value based on the average particularity value by increasing the confidence value corresponding to a data space with a higher particularity value. Additionally or alternatively, control circuitry 304 may decrease the confidence value corresponding to a data space with a lower particularity value. For example, control circuitry 304 may determine that the first data space uses a scale of 10 numbers to represent users' levels of enjoyment with respect to media assets. Control circuitry 304 also may determine that the second data space uses a scale of 5 numbers to represent users' level of enjoyment with respect to media assets. As a result, control circuitry 304 determines that the particularity value of the first data space is 10 and the particularity value of the second data space is 5. Alternatively or additionally, control circuitry 304 may determine that first data space is twice as particular as the second data space.

After calculating the error value, control circuitry 304 provides the error value to a model along with data associated with the error value in order to update the model based on the error value and the associated data. For example, the model may have trainable parameters as discussed above. Trainable parameters may include weights of every kind of user preference information that is relied upon by the model. For example, the user's indicated level of enjoyment with respect to a media asset may have a weight value of 0.9 on a scale of zero "0" to one "1". However, the percentage of a media asset consumed may have a weight of 0.2 on the same scale. Such a high value may be assigned to the user's indicated level of enjoyment with respect to a media asset because user feedback may be one of the most reliable kinds of user preference information. Percentage of media asset consumed may have such a low weight because a user may have stopped consuming the media asset for a variety of reasons and not because she did not like the media asset. Control circuitry 304 may determine what those weights are for specific kinds of preference information and adjust the weights in order to minimize the error value. Control circuitry 304 may use the associated data for adjusting the weights as the associated data may represent the adjustment amounts that are needed in order to improve the accuracy of the model.

Control circuitry 304 may update the model based on the error value and the data associated with the error value by computing a derivative of a composition of both (1) a function used to determine the indication of similarity between a first media asset and the second media asset and (2) a function to determine the expected media asset similarity value and updating the model based on the computed derivative. This is known as a chain rule. The chain rule is applied by modifying trainable parameters of the model.

In some embodiments, after normalizing the first preference information and the second preference information as described above, control circuitry 304 may determine, using the normalized first preference information and the normalized second preference information, a user's level of enjoyment with respect to a media asset based on the common metric, where the first preference information and the second preference information each comprise data describing the user's level of enjoyment of the media asset. For example, control circuitry 304 may retrieve the first preference information and the second preference information associated with a specific media asset. Control circuitry 304 may retrieve the first preference information and the second preference information by any of the methods described above. Based on the retrieved preference information, control circuitry 304 may determine that a user's level of enjoyment of a media asset is a value of 7 on a scale of 1 to 10.

In some embodiments, control circuitry 304 may determine, based on a model, an expected level of enjoyment that the user is expected to have with respect to the media asset. In FIG. 5, control circuitry 304 may generate for display areas 520 and 570 that indicate a user's expected level of enjoyment with respect to a selected media asset 554. Some content providers display the user's expected level of enjoyment with respect to a media asset as a suggestion to a user where the suggested media asset would include the system's determination of how the user would rate the media asset. Other content providers may just suggest a media asset to a user and indicate that the user is likely to enjoy the media asset.

In some embodiments, control circuitry 304 may determine an error value, wherein the error value is based on a comparison between the level of enjoyment and the expected level of enjoyment. For example, control circuitry 304 may generate for display item 572 in display 550 of FIG. 5 which illustrates that the selected media asset 554 named "Titanic" has an expected user's level of enjoyment of 8 on a scale of 1 to 10. Control circuitry 304 may determine a different user's level of enjoyment with respect to "Titanic" than the user's expected level of enjoyment with respect to "Titanic" based on the first preference information and the second preference information. As a result, control circuitry 304 may determine an error value. For example, control circuitry 304 may determine that the user's level of enjoyment with respect to a media asset is 6 on a scale of 1 to 10 and control circuitry 304 may receive an expected user's level of enjoyment from the model as 8 on the same scale. The difference of 2 together with the data associated with the difference may be used to determine the error value. As described above, control circuitry 304 may update trainable parameters and their weights in order to make the model more accurate.

A calculation of the error value may be represented by the following equation:

$$E2 = \Sigma_{d=1}^{D_{i/x}} \Sigma_{u=1}^{U(d)} \Sigma_{i=1}^{N} (R_{ui}(d) - r_{ui}(d))^2 \qquad \text{Equation 4}$$

where the parameters of Equation 4 are defined as follows:
E2 error value between the value based on an expected user's level of enjoyment and the value based on the user's level of enjoyment
$D_{i/x}$ number of data spaces including user preference information in the form of user interactions with media assets and in the form of indicated users' level of enjoyment with respect to media assets
d data space identifier
U(d) user count for data space d
u user identifier between 1 and U(d)
N number of media assets over all data spaces
i media asset identifier
$R_{ui}(d)$ User u's indicated of level of enjoyment with respect to media asset i over data space d
$r_{ui}(d)$ User u's level of enjoyment with respect to media asset i over data space d based on user u's interactions with the media asset As discussed above, in some embodiments, control circuitry 304 may use metadata in order to determine that media assets from different data spaces contain the same content. Different metadata attributes of the media asset may be used including title, release date, genre, length, description, etc.

In some embodiments, control circuitry 304 may calculate a first confidence value in the user's level of enjoyment of the media asset based on the first preference information by determining the amount of data associated with the media asset within the first data space. Control circuitry 304 may also calculate a second confidence value in the user's level of enjoyment of the media asset based on the second preference information by determining the amount of data associated with the media asset within the second data space. Control circuitry 304 may determine a combined confidence value based on the first confidence value and the second confidence value by averaging the two confidence values using a standard mathematical formula. Control circuitry 304 may adjust the level of enjoyment that the user has with respect to the media asset based on the combined confidence value by increasing the weight of the user's level of enjoyment value corresponding to a data space with a higher confidence value. Control circuitry 304 may, alternatively or additionally, decrease the weight of the user's level of enjoyment value corresponding to a data space with a lower confidence value. For example, control circuitry 304 may calculate the user's level of enjoyment with respect to a media asset that is included in the first data space based on thousands of indicated users' levels of enjoyment entries. Control circuitry 304 may calculate the user's level of enjoyment with respect to a media asset included in the second data space based only on hundreds of indicated user levels of enjoyment entries. As a result, control circuitry 304 may adjust the user's level of enjoyment of a specific media asset to be closer to that of the first data space than that of a second data space. Control circuitry 304 may calculate the confidence value using the following equation:

$$E2 = \Sigma_{d=1}^{D_{i/x}} \Sigma_{u=1}^{U(d)} \Sigma_{i=1}^{N} C_{ui}(d)(R_{ui}(d) - r_{ui}(d))^2 \qquad \text{Equation 5}$$

where the parameters of Equation 5 are defined as follows:
E2 error value between the value based on an expected user's level of enjoyment and the value based on the user's level of enjoyment
$D_{i/x}$ number of data spaces including user preference information in the form of user interactions with media assets and in the form of indicated users' level of enjoyment with respect to media assets d data space identifier
U(d) user count for data space d
u user identifier between 1 and U(d)
N number of media assets over all data spaces
i media asset identifier
$R_{ui}(d)$ User u's indicated of level of enjoyment with respect to media asset i over data space d
$r_{ui}(d)$ User u's level of enjoyment with respect to media asset i over data space d based on user u's interactions with the media asset
$C_{ui}(d)$ confidence in model $r_{ui}(d)$ of (u,i) over d In some embodiments, control circuitry 304 determines confidence values based on an amount of data associated with the media asset in the first data space. For example, if control circuitry 304 determines that a media asset has a thousand entries associated with it in the first data space and a media asset that includes the same content has only on hundred entries associated with it in the second data space, confidence in the first data space may be greater than confidence in the second data space.

In some embodiments, control circuitry 304 may determine a first degree of particularity, where the first degree of particularity is based on the first preference information by determining a number of levels of enjoyment a user may select with respect to a media asset. Control circuitry 304 may also determine a second degree of particularity, wherein the second degree of particularity is based on the second preference information by the same method as control circuitry 304 determines the first degree of particularity. Control circuitry 304 may calculate a combined particularity value based on the first degree of particularity and the second degree of particularity by, for example, average the two values using a standard mathematical formula for an average. Control circuitry 304 may determine the combined confidence value based on the combined particularity value by increasing the confidence value corresponding to a data space with a higher particularity value. Additionally or alternatively, control circuitry 304 may decrease the confidence value corresponding to a data space with a lower particularity value. For example, control circuitry 304 may determine that the first data space stores users' levels of enjoyment with respect to media assets as a number of stars between 0 stars and 5 stars. This scale would have a particularity value of 6 because a user can pick six different values to indicate her level of enjoyment of a media asset. Control circuitry 304 may determine that a second data space stores users' levels of enjoyment in media assets as a number between 0 and 10. This system would have a particular value of 11 because a user can pick among eleven different values. As a result, control circuitry 304 may determine that the second data space is more particular than the first data space; thus, based on the particularity values, control circuitry 304 may determine that the confidence value in the second data space may be greater than in the first data space.

In some embodiments, control circuitry 304 determines the combined confidence value by calculating a weighted average of the first degree of particularity and the second degree of particularity. Control circuitry may use a standard mathematical formula for calculating a weighted average. In the example above, control circuitry 304 has determined that the particularity value of the first data space is 6 and the particularity value of the second data space is 11. Control circuitry 304 may weigh 6 greater than 11. For example, control circuitry 304 may determine that the first data space may be known to have more reliable user preference information than the second data space. In another example, control circuitry 304 may determine that the first data space contains users that are more similar to the users in the data space that the model will be applied to.

In some embodiments, control circuitry 304 may provide the error value and data associated with the error value to the model, and update the model based on the error value and the data associated with the error value. Control circuitry 304 may compute a derivative of a composition of both (1) a function used to determine the level of enjoyment that the user has with respect to the media asset and (2) a function to determine the expected level of enjoyment that the user is expected to have with respect to the media asset and update the model based on the computed derivative. In order to apply the computer derivative to the model, control circuitry 304 may determine the model's trainable parameters, wherein the model's trainable parameters comprise updatable values used to improve accuracy of the expected level of enjoyment of the user with respect to the media asset and update the trainable parameters based on the computed derivative. Trainable parameters and how control circuitry 304 may update the trainable parameters are discussed earlier in this application.

In some embodiments, control circuitry 304 may receive first preference information of a first plurality of users. The first preference information may be associated with a first data space and may describe monitored user interactions of the first plurality of users with respect to the first plurality of media assets. The first plurality of media assets may also correspond to the first data space. Control circuitry 304 may receive the first preference information in the same manner as described above. For example, control circuitry 304 may receive the first plurality of media assets from media guidance data source 418 or media content source 416 via communications network 414. Examples of information describing a user's monitored interactions with respect to media assets may include information and whether the user consumed the media asset, the number of times the user consumed the media asset, the number of similar media assets that the user consumed, price that the user paid for the media asset, average price that the user has paid for media assets, average level of enjoyment that the user indicated with respect to media assets, the time that the user spent consuming the media asset, percentage of the media asset that the user consumed, percentage of the series associated with the media asset that the user has consumed, the number of times that a user was able to choose to consume the media asset, the speed with which the user consumed the media asset, the speed with which the user consumed a series associated with the media asset, whether the user consumed the media asset before other media assets if given a choice, the number of times the user tuned in to the media asset, the number of times the user tuned in to the media asset relative to a number of times that the media asset was available to the user to be tuned in to, and whether a user wrote a review of the media asset. This information may be represented in the following manner where u represents a user and i represents a media asset:

I1 hasViewed(u, i) represents data on whether user u has consumed at least a part of media asset i. This may be a binary representation.
I2 numViewed(u, i) represents a count of how many times user u consumed media asset i.
I3 numViewedSim(i) represents the number of media assets that user u has consumed similar to media asset i
I4 price(i) represents the price that user u pays for media asset i I5 price(i)/average price(u) represents the relative price that user u pays for i
I6 avgUserRating(i) represents the average user rating for i
I7 popularity(i) represents the popularity of media asset i
I8 duration(u, i) represents the time that user u spent consuming media asset i
I9 precentageShow(u, i) represents the percentage of the media asset i that user u consumed
I10 percentageSeries(u, i) represents the percentage of a series associated with media asset i that user u consumed
I11 exposed(u, i) represents the number of times that user u could have selected media asset i to consume
I12 speedofvieweing1(u, i) represents the speed of user u consuming media asset i at first chance
I13 speedofviewing2(u, i) represents the speed with which user u consumed episodes associated with a series corresponding to media asset i
I14 isseries(i) represents information on whether media asset i is associated with a series
I15 orderofvieweing (u, i) represents inferring a greater preference for a media asset if it was consumed before another media asset
I16 tuneins(u, i) represents the number of tune-ins for EPG
I17 tuneinsRelative(u, i) represents the number of tune-ins for EPG relative to the total possible tune-ins for media asset i
I18 opinionLinked(u, i) represents an estimate of the "liked" component of W2V opinion In some embodiments, control circuitry 304 may express this information as an input vector $\vec{I}_{ui}(d)$, where u represents a user, i represents a media asset, and d represents a specific data space. The vector may contain at least some of the information described above. Control circuitry 304 may create a vector having 18 dimensions if information describing all the above identified monitored user interactions are available. Control circuitry 304 may store the created vector in storage 308 (e.g., RAM, ROM, Hard Disk, Removable Disk, etc.). Additionally or alternatively, control circuitry 304 may store the created vector at media guidance data source 418 and/or media content source 416. In some embodiments control circuitry 304 may store some data associated with the created vector in each of storage 308, media guidance data source 418, and media content source 416.

In some embodiments, control circuitry 304 may receive second preference information of a second plurality of users. The second preference information may be associated with a second data space and may include levels of enjoyment that are expressly input by the second plurality of users with respect to the second plurality of media assets. Further, the second plurality of media assets may correspond to the second data space. Control circuitry 304 may receive the second preference information in the same manner as described above. Levels of enjoyment that are expressly input by the second plurality of users correspond to levels of enjoyment with respect to media assets described above. For example, control circuitry 304 may receive the second plurality of media assets from media guidance data source 418 or media content source 416 via communications network 414.

In some embodiments, control circuitry 304 may express this information as an input vector $\vec{X}_{ui}(d)$ where u represents a user, i represents a media asset, and d represents a specific data space. Control circuitry 304 may store the created vector in storage 308 (e.g., RAM, ROM, Hard Disk, Removable Disk, etc.). Additionally or alternatively, control circuitry 304 may store the created vector at media guidance data source 418 and/or media content source 416. In some embodiments control circuitry 304 may store some data associated with the created vector in each of storage 308, media guidance data source 418, and media content source 416.

In some embodiments, control circuitry 304 may transform the first preference information to first consumption layer preference information, where the first consumption layer preference information comprises specific attributes that are indicative of users' preferences. Control circuitry 304 may transform the first and second preference information in the same manner as normalizing first and second preference information. In some embodiments, control circuitry 304 may retrieve the vectors described above from storage 308 and map them to consumption layer preference information where the output of the transformation may include consumption layer preference information for each user with respect to each media asset over a specific data space. Additionally or alternatively, control circuitry 304 may determine a quality value associated with each transformation. The output may be expressed as follows:

Preference$(u,i,d)=r_{ui}(d)$

Quality$(u,i,d)=q_{ui}(d)$

Where the parameters are defined as follows:
i a media asset within data space d
u a user within data space d
d a data space
$q_{ui}(d)$ a quality $r_{ui}(d)$ a preference Control circuitry 304 may transform the first preference information in various ways based on a set of trainable parameters that are available and the weights of those parameters. For example, the following equation may be used to describe transforming monitored user interactions into consumption layer preference information:

$$r_{ui}(d^I)=f_{f1}(\text{inputs,weights})=f_{f1}(\vec{I}_{ui}(d^I),\vec{W}) \qquad \text{Equation 6}$$

where the parameters are defined as follows:
$r_{ui}(d)$ represents a preference
$f_{f1}$(inputs,weights) represents an input function of one of the above described I1-I18 parameters
$f_{f1}(\vec{I}_{ui}(d^I),\vec{W})$ represents vector inputs and their weights In some embodiments, control circuitry 304 may transform the second preference information to second consumption layer preference information, where the second consumption layer preference information comprises specific attributes that are indicative of users' preferences. The transformation may be done via mapping users' levels of enjoyment with respect to media assets in the following manner:

$$r_{ui}(d^X) = \frac{\text{Rating}(u, i, d^X) - \text{MinRating}(d^X)}{\text{MaxRating}(d^X) - \text{MinRating}(d^X)} \qquad \text{Equation 7}$$

where for example, MinRating$(d^X)=1$, MaxRating$(d^X)=5$. Thus, for data spaces including users indicated levels of enjoyment in the range of 1-5, $q_{ui}(d^X)=1$.

In some embodiments, control circuitry 304, may determine first user preference details corresponding to a first media asset and a second media asset based on the first consumption layer preference information. Control circuitry 304 may determine first user preference details by normalizing the first consumption layer preference information to a value between 0 and 1. Control circuitry 304 may store the first user preference details in storage 308. Alternatively or additionally, control circuitry 304 may store first user preference details at media guidance source 418 and/or media content source 416 by transmitting the user preference details to those destinations via communications network 414.

In some embodiments, control circuitry 304 may determine second user preference details corresponding to the first media asset and the second media asset based on the second consumption layer preference information. Control circuitry 304 may determine second user preference details by normalizing the second consumption layer preference information to a value between 0 and 1. Control circuitry 304 may store the first user preference details in storage 308. Alternatively or additionally, control circuitry 304 may store first user preference details at media guidance source 418 and/or media content source 416 by transmitting the user preference details to those destinations via communications network 414.

In some embodiments, control circuitry 304 may determine a first sentimental similarity between a first media asset and a second media asset, where the first sentimental similarity corresponds to a degree of similarity between the first media asset and the second media asset based on the first user preference details. Control circuitry 304 may determine a sentimental similarity value between two media assets in the same manner as determining indications of similarity values described above. Additionally or alternatively, control circuitry 304 may use several ways of calculating similarities between media assets. These may include Pearson correlation coefficient, Cosine similarity, Log Likelihood, Jaccard, Co-occurrence, Probabilistic similarity and more. Additionally or alternatively, control circuitry 304 may make the determination by transmitting data associated with determining the first sentimental similarity to media content source 416 and/or media guidance data source 418 via communications network 414. Control circuitry 304 may receive the determination back from media content source 416 and/or media guidance data source 418.

In some embodiments, control circuitry 304 may determine the first sentimental similarity using the equation below:

$$ISim(i, j, d) = p_{ij}(d = d^I) = \frac{\sum_{u \in (i,j)}^{U(d)} (r_{ui}^I(d) - \bar{r}_i^I(d))(r_{uj}^I(d) - \bar{r}_j^I(d))}{\sqrt{\sum_{u \in (i,j)}^{U(d)} (r_{ui}^I(d) - \bar{r}_i^I(d))^2} \sqrt{\sum_{u \in (i,j)}^{U(d)} (r_{uj}^I(d) - \bar{r}_j^I(d))^2}}$$

Equation 8 where the parameters of this equation are as follows:
d represents a data set identifier
$d^I$ represents a data set identifier for a data set that includes users' monitored interactions with respect to media assets
$P_{ij}(d=d^I)$ represents Pearson similarity between media asset i and media asset j for data space d
u represents a user identifier
u∈(I, j) represents a user identifier, where the user has interacted with respect to both media assets i and j in data space d
U(d) represents a total number of users who have interacted with both media assets i and j in data space d $r_{ui}^I(d)$ represents an estimated indicated level of enjoyment of user u associated with data space d with respect to media asset i in data space d
$r_{uj}^I(d)$ represents an estimated indicated level of enjoyment of user u associated with data space d with respect to media asset j in data space d
$\bar{r}_i^I(d)$ represents an average estimated indicated level of enjoyment of users associated with data space d with respect to media asset i in data space d
$\bar{r}_j^I(d)$ represents an average estimated indicated level of enjoyment of user u associated with data space d with respect to media asset j in data space d.

In some embodiments, control circuitry 304 may determine a second sentimental similarity between a first media asset and a second media asset, where the second sentimental similarity corresponds to a degree of similarity between the first media asset and the second media asset based on the second user preference details. Control circuitry 304 may determine a sentimental similarity value between two media assets in the same manner as determining indications of similarity values described above. Additionally or alternatively, control circuitry 304 may make the determination by transmitting data associated with determining the second sentimental similarity to media content source 416 and/or media guidance data source 418 via communications network 414. Control circuitry 304 may receive the determination back from media content source 416 and/or media guidance data source 418.

In some embodiments data spaces that have less co-occurrence may be penalized. For example, control circuitry 304 may determine the second sentimental similarity using the equation below:

$$XSim(i, j) = \frac{1}{D_{explicit}} \sum_{d=1}^{D_{explicit}} RateSim(i, j, d)$$

Equation 9

The parameters of Equation 8 may be identical to parameters of Equation 3. The RateSim(i, j, d) component may be determined by the following equation:

$$RateSim(i, j, d) =$$

Equation 10

$$P_{ij}(d = d^X) = \frac{\sum_{u \in (i,j)}^{U(d)} (r_{ui}^X(d) - \bar{r}_i^X(d))(r_{uj}^X(d) - \bar{r}_j^X(d))}{\sqrt{\sum_{u \in (i,j)}^{U(d)} (r_{ui}^X(d) - \bar{r}_i^X(d))^2} \sqrt{\sum_{u \in (i,j)}^{U(d)} (r_{uj}^X(d) - \bar{r}_j^X(d))^2}}$$

where the parameters of this equation are as follows:
d represents a data set identifier
$d^X$ represents a data set identifier for a data set that includes users' indicated levels of enjoyment with respect to media assets
$P_{ij}(d=d^X)$ represents Pearson similarity between media asset i and media asset j for data space d
u represents a user identifier
u∈(I, j) represents a user identifier, where the user has indicated his level of enjoyment with respect to both media assets i and j in data space d U(d) represents a total number of users who have indicated their level of enjoyment with respect to both media assets i and j in data space d $r_{ui}^X(d)$ represents user u's indicated level of enjoyment with respect to media asset i in data space d $r_{uj}^X(d)$ represents user u's indicated level of enjoyment with respect to media asset j in data space d $\bar{r}_i^X(d)$ represents an average users' indicated level of enjoyment with respect to media asset i in data space d $\bar{r}_j^X(d)$ represents an average users' indicated level of enjoyment with respect to media asset j in data space d.

In order to penalize data sets that have less co-occurrence data, control circuitry 304 may implement the following equations:

$$XSim(i,j) = C_{ij} \sum_{d=1}^{D_{explicit}} RateSim(i,j,d) \quad \text{Equations 11}$$

$$C_{ij} = \frac{\beta_{ij}}{\beta_{ij} + \alpha}$$

$$\beta_{ij} = \sum_{d=1}^{D_{explicit}} Q_d^X * Cooccur(i,j,d)$$

$$Q_d^X = q_{ui}(d^X) = \frac{MaxRating(d^X) - MinRating(d^X)}{TrustedRatingRange}$$

where the parameters of this equation are as follows:

$D_{explicit}$ represents a total number of data spaces that include users' indicated levels of enjoyment with respect to media assets d represents a data space identifier for a data space that includes users' indicated levels of enjoyment with respect to media assets XSim(i,j) represents a sentimental similarity based on users' indicated levels of enjoyment with respect to media assets i and j $C_{ij}$ represents a confidence value in weighing of sentimental similarity RateSim(i,j,d)

$\beta_{ij}$ represents a shrinking term for pair (i,j)

$\alpha$ represents a shrinkage scalar $Q_d^X$ represents an estimate of quality for user's indicated level of enjoyment with respect to a media asset Cooccur(i,j,d) represents a co-occurrence count for data set d for users who have consumed both media asset i and media asset j MinRating($d^X$) represents a minimum indication of a level of enjoyment with respect to a media asset that a user can provide MaxRating($d^X$) represents a maximum indication of a level of enjoyment with respect to a media asset that a user can provide TrustedRatingRange represents a scalar to normalize $Q_d^X$ to a maximum of 1 and a minimum of 0

Where $\alpha$ is specified as some scalar number (e.g., 100) as the co-occurrence increases, Cij can approach 1. With minimal data, co-occurence decreases and will eventually approach 0.

In some embodiments, control circuitry 304 performing tasks of an error model may determine a difference between the first sentimental similarity and the second sentimental similarity. Control circuitry 304 may determine the error value based on Equation 3 above.

In some embodiments, the difference may be a pair-wise difference and control circuitry 304 may adjust based on the pair-wise difference between the first sentimental similarity and the second sentimental similarity, the first user preference details and the second user preference details determined from the first and second consumption layer preference information in order to minimize the error value. Control circuitry 304 may adjust the sentimental similarity values by adjusting weights associated with trainable parameters of a preference model.

In some embodiments, control circuitry 304 may, when adjusting, based on the difference between the first sentimental similarity and the second sentimental similarity, the user preference details, apply a chain rule in order to determine weights associated with trainable parameters of the preference model. Application of a chain rule is described above. Control circuitry 304 may execute the chain rule via instructions representing the equation below:

$$\frac{dE1}{d\vec{W}^I} = \frac{dE1}{dL3} \frac{dL3}{dL2} \frac{dL2}{d\vec{W}^I} \quad \text{Equation 12}$$

where the parameters of this equation are as follows:

$\vec{W}^I$ represents weights for a model that generates both sentimental similarity values based on users' monitored interactions with respect to media assets and qualities associated with those values $$\frac{dE1}{d\vec{W}^I}$$

represents partial derivative of E1 with respect to the weights $$\frac{dE1}{dL3}$$

represents partial derivative of E1 with respect to the similarity layer $$\frac{dL3}{dL2}$$

represents partial derivative of the similarity layer with respect to preference layer $$\frac{dL2}{d\vec{W}^I}$$

represents partial derivative of preference layer with respect to consumption layer In some embodiments, control circuitry 304 may, when determining the user preference details corresponding to the given media asset based on the consumption layer preference information, apply at least one of a linear transformation function, a neural network, and a restricted Boltzmann machine. Control circuitry 304 may execute instructions associated with mathematical formulas for a linear transformation function, a neural network and a restricted Boltzmann machine respectively. Additionally or alternatively, control circuitry 304 may make the determination by transmitting data associated with determining the user preference details to media content source 416 and/or media guidance data source 418 via communications network 414. Control circuitry 304 may receive the determination back from media content source 416 and/or media guidance data source 418.

In some embodiments, control circuitry 304 may, when determining the first sentimental similarity between the first media asset and the second media asset based on the received user preference details associated with the first data space, apply at least one of a Pearson's coefficient and cosine similarity. Control circuitry 304 may execute instructions associated with mathematical formulas for a Pearson's coefficient and cosine similarity respectively. Additionally or alternatively, control circuitry 304 may apply one of the functions above by transmitting data associated with the respective function to media content source 416 and/or media guidance data source 418 via communications network 414. Control circuitry 304 may receive the result back from media content source 416 and/or media guidance data source 418.

In some embodiments, control circuitry 304 may, when determining the difference between the first sentimental similarity and the second sentimental similarity, calculate a first quality value, where the first quality value is associated with the first sentimental similarity. Control circuitry 304 may calculate the first quality value based on the equations provided above. Quality may be expressed by the equations below:

$$q_{ui}(d^I) = f_{I2}(\text{inputs, weights}) = f_{I2}(\vec{I}_{ui}(d^I), \vec{W}) \quad \text{Equation 13}$$

$$q_{ui}(d^X) = \frac{\text{MaxRating}(d^X) - \text{MinRating}(d^X)}{\text{TrustedRatingRange}}$$

$$Q_d^X = q_{ui}(d^X) = \frac{\text{MaxRating}(d^X) - \text{MinRating}(d^X)}{\text{TrustedRatingRange}}$$

where the parameters of this equation are as follows:

$f_{I2}$ represents a function to model a quality of data describing users' monitored interactions with respect to media assets $\vec{I}_{ui}(d^I)$ represents a vector based on monitored user interactions of user u with respect to media asset i in data space d $\vec{W}$ represents trainable weights that function $f_{I2}$ applies to inputs $\vec{I}_{ui}(d^I)$ $q_{ui}^X(d)$ represents a quality value associated with user u's indicated level of enjoyment with respect to media asset i over data space d $q_{ui}^I(d)$ represents a quality value associated with user u's monitored interactions with respect to media asset i over data space d In some embodiments, control circuitry 304 may use the following equation to calculate sentimental similarity values based on quality values:

$$ISim^*(i, j, d) = p_{ij}^*(d = d^I) = \quad \text{Equation 14}$$

$$\frac{\sum_{u \in (i,j)}^{U(d)} \sqrt{q_{ui}^I(d)q_{uj}^I(d)}\,(r_{ui}^I(d) - \bar{r}_i^I(d))(r_{uj}^I(d) - \bar{r}_j^I(d))}{\sqrt{\sum_{u \in (i,j)}^{U(d)} q_{ui}^I(d)(r_{ui}^I(d) - \bar{r}_i^I(d))^2} \sqrt{\sum_{u \in (i,j)}^{U(d)} q_{uj}^I(d)(r_{uj}^I(d) - \bar{r}_j^I(d))^2}}$$

Where the parameters of this equation are as follows:
49676159_1
d represents a data set identifier
$d^I$ represents a data set identifier for a data set that includes users' monitored interactions with respect to media assets
$P_{ij}^*=(d=d^I)$ represents Pearson similarity between media asset i and media asset j for data space d
u represents a user identifier
u∈(i, j) represents user a identifier, where the user has interacted with respect to both media assets i and j in data space d
U(d) represents a total number of users who have interacted with both media assets i and j in data space d
$r_{ui}^I(d)$ represents an estimated indicated level of enjoyment of user u associated with data space d with respect to media asset i in data space d
$r_{uj}^I(d)$ represents an estimated indicated level of enjoyment of user u associated with data space d with respect to media asset j in data space d
$\bar{r}_i^I(d)$ represents an average estimated indicated level of enjoyment of users associated with data space d with respect to media asset i in data space d
$\bar{r}_j^I(d)$ represents an average estimated indicated level of enjoyment of user u associated with data space d with respect to media asset j in data space d
$q_{ui}^I(d)$ represents a quality value associated with an estimated indicated level of enjoyment of user u associated with data space d with respect to media asset i in data space d
$q_{uj}^I(d)$ represents a quality value associated with an estimated indicated level of enjoyment of user u associated with data space d with respect to media asset j in data space d.

In some embodiments, control circuitry 304 may make the determination by transmitting data associated with the determining to media content source 416 and/or media guidance data source 418 via communications network 414. Control circuitry 304 may receive the determination back from media content source 416 and/or media guidance data source 418.

In some embodiments, control circuitry 304 may, when determining the difference between the first sentimental similarity and the second sentimental similarity, calculate a second quality value, where the second quality value may be associated with the second sentimental similarity. Control circuitry 304 may calculate the first quality value based on the equations provided above.

In some embodiments, the quality value may be based on a number of users from a data space who consumed the first media asset and the second media asset. For example, if ten times as many users consumed the first and second media assets in the first data space than the second data space, control circuitry 304 may calculate the first quality value as ten times greater than the second quality value.

In some embodiments, the quality value may be based on a number of users from the second data space who expressly input their level of enjoyment with respect to the first media asset and the second media asset. For example, if ten times as many users input their level of enjoyment with respect to the first and second media assets in the first data space than the second data space, control circuitry 304 may calculate the first quality value as ten times greater than the second quality value.

In some embodiments, control circuitry 304 may, when determining, using the error model, the difference between the first sentimental similarity and the second sentimental similarity, determine a particularity of the first preference information and determine a particularity of the second preference information. Based on those determinations, control circuitry 304 may determine the difference between the first sentimental similarity and the second sentimental similarity. Particularity value determinations and examples are described above.

In some embodiments, control circuitry 304 may, when transforming the first preference information and the second preference information to consumption layer preference information, determine, for the first media asset of the first plurality of media assets, whether the first media asset is also within the second plurality of media assets. Control circuitry may in response to determining that the first media asset is also within the second plurality of media assets, generate a record for the first media asset, where the record comprises preference information that is retrieved from both the first data space and the second data space. This process is described above in relation to a normalizing process of the first preference information and second preference information.

In some embodiments, a data space may include both monitored user interactions of a plurality of users with respect to a plurality of media assets and levels of enjoyment that are expressly input by a plurality of users with respect to a plurality of media assets. In those embodiments, control circuitry 304 may use the same methods as described above to determine consumption layer preference information, however, all the data will come from the same data space and be associated either with monitored user interactions of the plurality of users with respect to the plurality of media assets or with levels of enjoyment that are expressly input by the plurality of users with respect to the plurality of media assets.

In some embodiments, control circuitry 304 may determine an estimated implicit user preference for a media asset, where the estimated implicit user preference for a media asset may be based on user preference details associated with monitored user interactions of a plurality of users with respect to the media asset. Control circuitry 304 may make that determination by employing the same methods as described above with respect to determining a user's level of enjoyment with respect to a media asset based on normalized preference information.

In some embodiments, control circuitry 304 may determine an estimated explicit user preference for a media asset, where the estimated explicit user preference is based on user preference details associated with levels of enjoyment that are input by the plurality of users with respect to the media asset. Control circuitry 304 may make that determination by employing the same methods as described above with respect to determining a user's level of enjoyment with respect to a media asset based on normalized preference information.

In some embodiments, control circuitry 304 may compare the estimated implicit user preference with the estimated explicit user preference. Control circuitry 304 may make the comparison through a straight mathematical calculation. For example, if the estimated implicit user preference is 7 on a scale of 1 to 10 and the estimated explicit user preference is an 8 on the same scale, control circuitry 304 may determine that the difference of 1 point on that scale exists.

In some embodiments, control circuitry 304 may determine an error value based on the comparison. Control circuitry 304 may determine the error value as a percent difference between the estimated implicit user preference and the estimated explicit user preference. Additionally or alternatively, control circuitry 304 may make the determination by transmitting data associated with determining the error value to media content source 416 and/or media guidance data source 418 via communications network 414. Control circuitry 304, may receive the determination back from media content source 416 and/or media guidance data source 418.

Figure 9:
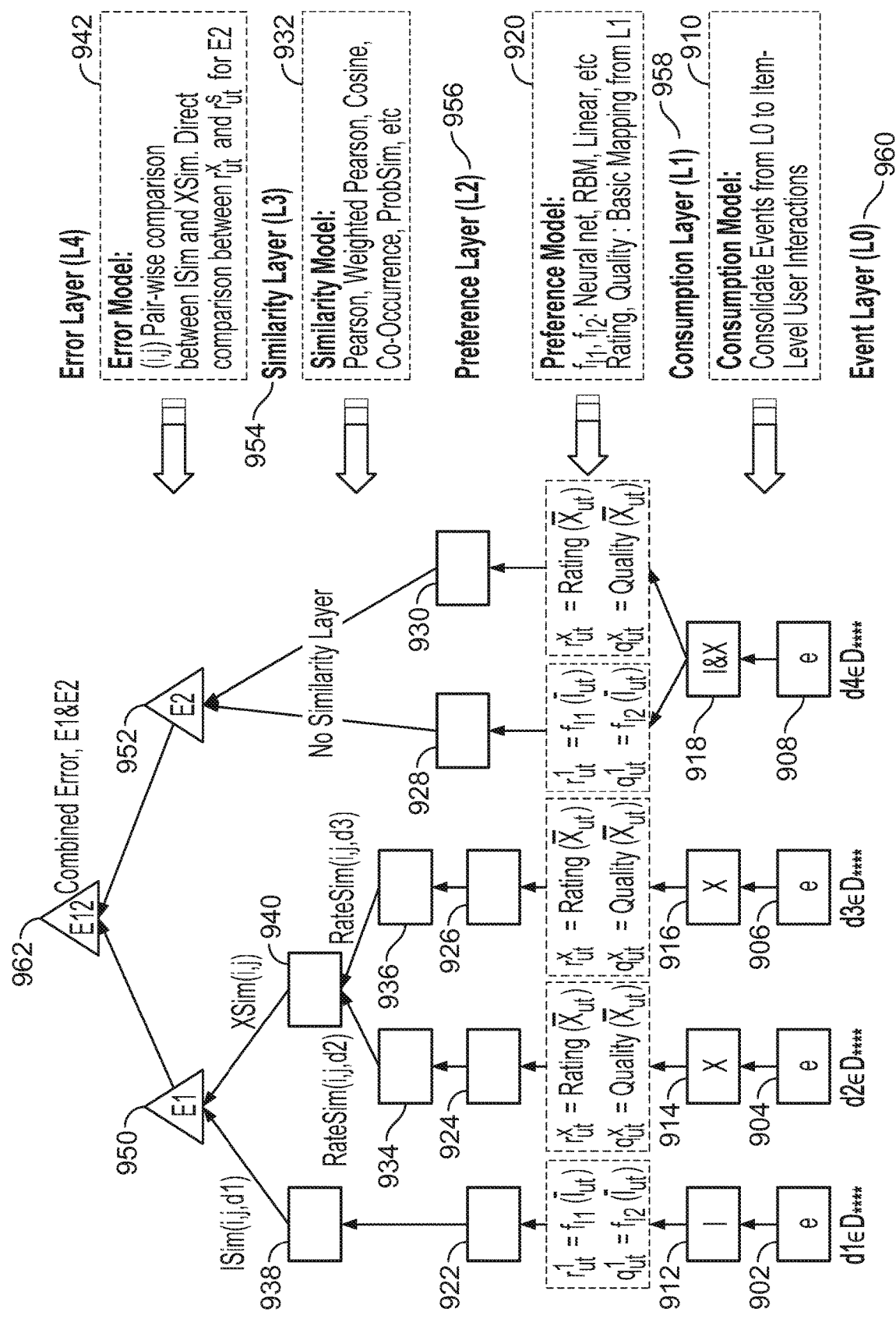
FIG. 9 illustrates a process of determining error values based on different types of preference information, in accordance with some embodiments of the disclosure.

In some embodiments, control circuitry 304 may calculate the error value based on the equation below:

$$E2 = \Sigma_{d=1}^{D_{i/x}} \Sigma_{u=1}^{U(d)} \Sigma_{i=1}^{N} \sqrt{q_{ui}^{X}(d) q_{ui}^{I}(d) (r_{ui}^{X}(d) - r_{ui}^{I}(d))^2} \quad \text{Equation 15}$$

where the parameters of this equation are as follows:
E2 represents an error value calculated by comparing the estimated implicit user preference for a media asset with an estimated explicit user preference for a media asset weighted by a quality value
d represents a data space identifier that includes both monitored user interactions with respect to media assets and users' indicated level of enjoyments with respect to media assets.
$D_{i/x}$ represents a total number of data spacing having both data describing user monitored interactions with respect to media assets and data describing users' indicated levels of enjoyment with respect to media assets
u represents a user identifier
U(d) represents a count of users who both interacted with media assets and indicated their level of enjoyment with respect to media assets in data space d
i represents a media asset identifier
N represents a total number of media assets in data space d
$q_{ui}^{X}(d)$ represents a quality of user u's indicated level of enjoyment with respect to media asset i in data space d
$q_{ui}^{I}(d)$ represents a quality of an estimated user u's indicated level of enjoyment with respect to media asset i in data space d based on user u's monitored interactions with media asset i
$r_{ui}^{X}(d)$ represents user u's indicated level of enjoyment with respect to media asset i in data space d
$r_{ui}^{I}(d)$ represents user u's estimated level of enjoyment with respect to media asset i in data space d based on user u's monitored interactions with media asset i In some embodiments, control circuitry 304 may apply a chain rule in order to improve accuracy of both estimated explicit and estimated implicit values. Control circuitry 304 may implement the chain rule via the following equation:

$$\frac{dE2}{d\vec{W}^I} = \frac{dE2}{dL2} \frac{dL2}{d\vec{W}^I} \quad \text{Equation 16}$$

where the parameters of this equation are as follows:
$\vec{W}^I$ represents weights for a model that generates both estimated implicit user preferences and estimated explicit user preferences and quality values $$\frac{dE2}{d\overrightarrow{W}^l}$$

represents a partial derivative of E2 with respect to the weights $$\frac{dE2}{dL2}$$

represents a partial derivative of E2 with respect to the preference layer $$\frac{dL2}{d\overrightarrow{W}^l}$$

represents a partial derivative of a preference layer with respect to a consumption layer FIG. 9 shows an illustrative embodiment of both implementing a combination of functions E1 and E2. Control circuitry 304 receives items 902, 904, 906, and 908 that represent event information that is collected by different content providers. For example, control circuitry 304 may receive items 902, 904, and 906 from media content source 416 and/or media guidance data source 418 via communications network 414. Additionally or alternatively, control circuitry 304 may receive items 902, 904, and 906 from any source on the Internet. Item 902 represents event information that includes monitored user interactions with respect to media assets that comes from one data space (e.g., data space d1). Items 904 and 906 represent data spaces with event information that includes levels of enjoyment that are expressly input by the plurality of users with respect to the plurality of media assets. Item 906 represents a data space that includes both monitored user interactions with respect to media assets and levels of enjoyment that are expressly input by the plurality of users with respect to the plurality of media assets.

Control circuitry 304 may be configured to perform tasks of consumption model 910. Control circuitry 304 consolidates raw event data into consumption layer preference information 912, 914, 916, and 918. Formulas and methods for this consolidation are described above with respect to transforming information into consumption layer preference information.

Control circuitry 304 may be configured to perform tasks of preference model 920. Control circuitry 304 transforms consumption layer preference information into user preference details 922, 924, 926, 928, and 930. Control circuitry 304 may make the transformation by using a linear transformation function, a neural network, or a restricted Boltzmann machine as described above. The output of preference model 920 may be described by the formulas that the preference model uses.

$$r_{ut}^1 = f_{r1}(\overrightarrow{I_{ut}})$$

$$q_{ut}^1 = f_{r2}(\overrightarrow{I_{ut}})$$

Equation 17 where the parameters of this equation are as follows:
r is a preference of user u for media asset t
f is a function for input vector 1 that uses as an input vector monitored user interaction of user u with respect to media asset t to determine preference r.

q is a quality value associated with preference r using the same vector information for the same user and the same media asset.

$$r_{ut}^x = \text{Rating}(\overrightarrow{I_{ut}})$$

$$q_{ut}^x = \text{Quality}(\overrightarrow{X_{ut}})$$

Equation 18 where the parameters of this equation are as follows:
r represents a level of enjoyment that is expressly input by user u (e.g., Rating) with respect to media asset t
f represents a function for input vector X that uses as an input vector a level of enjoyment that user u expressly input for media asset t
q represents a quality value associated with Rating r using the same vector information for the same user and the same media asset.

Control circuitry 304 may be configured to perform tasks of similarity model 932. Control circuitry 304 transforms preference information 924 and 926 into similarity layer information 954 represented by items 934 and 936, which are associated with their respective data spaces. Once this transformation is complete, control circuitry 304 transforms the two different similarity values from two different data spaces into one similarity value represented by item 940. Control circuitry 304 may for example average two similarity values from two different data spaces. In some embodiments control circuitry 304 may use a weighted average to calculate transforming two values into one. Control circuitry 304 may use quality values and/or particularity values to add weights to the average.

Control circuitry 304 transforms user preference details 922 into similarity layer information 938. Control circuitry 304 may transform the information by calculating a Pearson coefficient.

Control circuitry 304 may be configured to perform tasks of error model 942. Control circuitry 304 calculates and compares similarity information 938 and 940 in order to find an error value 950. Control circuitry 304 compares similarity information 938 and 940 as described above with respect to calculating a difference between the first sentimental similarity and the second sentimental similarity.

Control circuitry 304 may be configured to perform tasks of error model 942. Control circuitry 304 calculates error value 952 between items 928 and 930. Control circuitry 304 may calculate the error value in the same manner as it calculates an error value with regard to estimated implicit preference and estimated explicit preference as described above.

Control circuitry 304 may combine error values 950 and 952 in order to get a combined error value 962. The combined error value may more accurately determine the weight changes of trainable parameters that must be made in order to minimize the combined error value.

Figure 6:
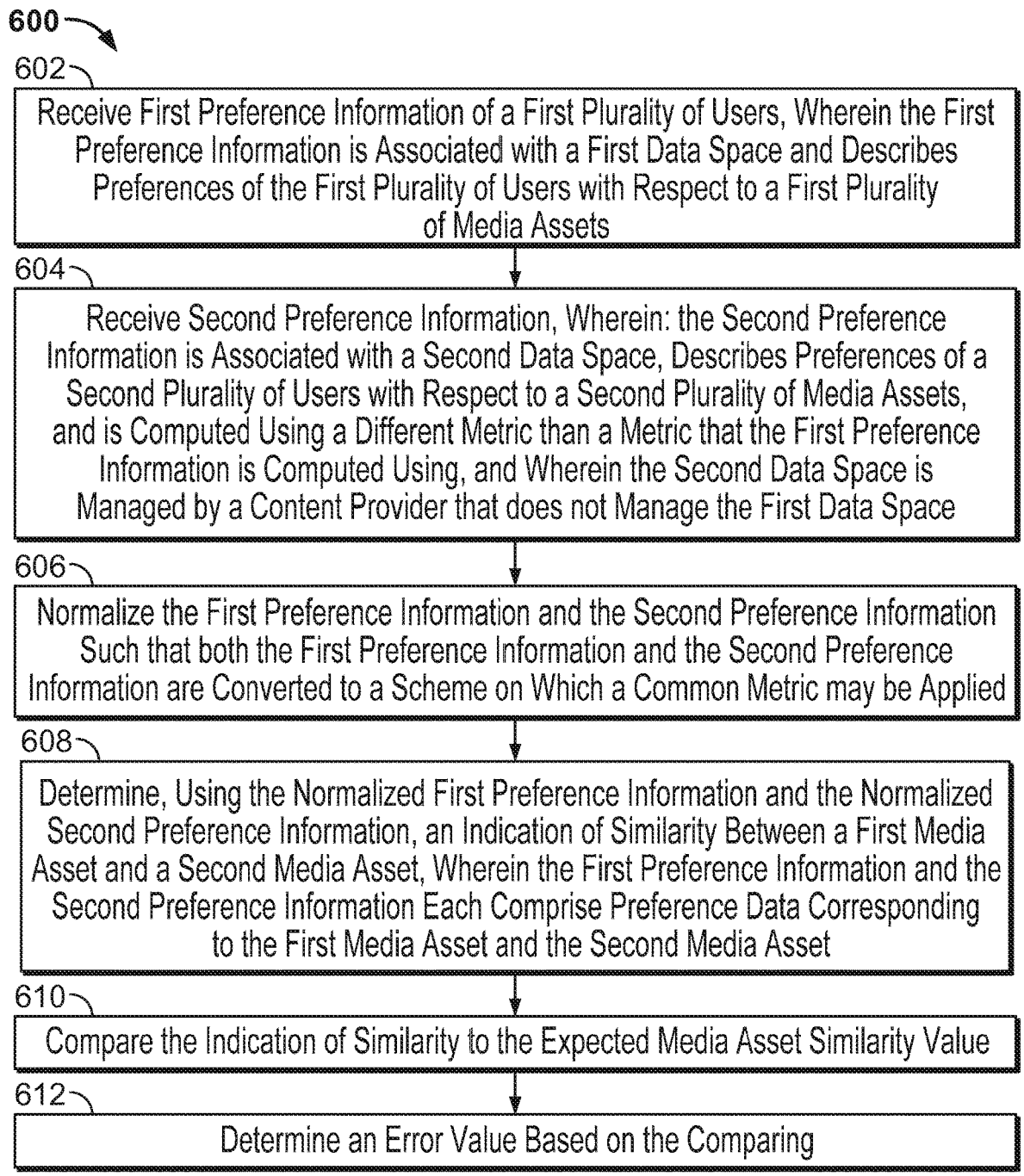
FIG. 6 is a flowchart of illustrative steps involved in determining an error value based on comparing an expected media asset similarity value corresponding to a first media asset and a second media asset, as determined using a model, to a media asset similarity value determined from user preference information associated with multiple data spaces, in accordance with some embodiments of the disclosure.

FIG. 6 is a flowchart of illustrative steps for determining an error value based on comparing an expected media asset similarity value corresponding to a first media asset and a second media asset, as determined using a model, to a media asset similarity value determined from user preference information associated with multiple data spaces. It should be noted that process 600 or any step thereof could be performed on, or provided by, any of the devices shown in FIGS. 3-4. For example, process 600 may be executed by control circuitry 304 (FIG. 3) as instructed by a media guidance application implemented on user equipment 402, 404, and/or 406 (FIG. 4) in order to distribute control of media guidance application operations for a target device among multiple user devices. In addition, one or more steps of process 600 may be incorporated into or combined with one or more steps of any other process or embodiment (e.g., process 700 (FIG. 7), process 800 (FIG. 8), process 1000 (FIG. 10), and process 1100 (FIG. 11)).

At 602, control circuitry 304 receives first preference information of a first plurality of users, wherein the first preference information is associated with a first data space and describes preferences of the first plurality of users with respect to a first plurality of media assets. For example, control circuitry 304 may use communications network 414 (FIG. 4) in order to communicate with a database of a content provider of the first data space or another entity where the first preference information may be received from. The media guidance data source may request the first preference information from the content provider and then transmit an indication to control circuitry 304 that the first preference information was received. The first preference information may be stored in storage 308 or at the media guidance data source 418.

At 604, control circuitry 304 receives second preference information, wherein the second preference information is associated with a second data space, describes preferences of a second plurality of users with respect to a second plurality of media assets, and is computed using a different metric than a metric that the first preference information is computed using, and wherein the second data space is managed by a content provider that does not manage the first data space. For example, control circuitry 304 may use communications network 414 (FIG. 4) in order to communicate with a content provider of the first data space or another entity where the preference information may be received from. Media guidance data source 418 may, for example, transmit a request to the content provider and receive from the content provider user preference information.

At 606, control circuitry 304 normalizes the first preference information and the second preference information such that both the first preference information and the second preference information are converted to a scheme on which a common metric may be applied. For example, control circuitry 304 may use a database in order to create a record for each media asset that exists in both the first data space and the second data space. As an example, control circuitry 304 may create a record in a database. The record may be in a form of a database table or it may be an entry in a database table. The database may be located locally (e.g., at storage 308 (FIG. 3)) or remotely (e.g., at the media guidance data source 418, accessible by way of communications network 414). Control circuitry 304 may transmit the creation of the record to the database at the media guidance data source 418 via communications network 414. Control circuitry 304 may determine if two media assets from different data spaces contain the same content by comparing metadata entries retrieved from either storage 308 or from the media guidance data source 418 via communications network 414.

At 608, control circuitry 304 determines, using the normalized first preference information and the normalized second preference information, an indication of similarity between a first media asset and a second media asset, wherein the first preference information and the second preference information each comprise preference data corresponding to the first media asset and the second media asset. For example, control circuitry 304 may search the first media preference information and the second preference information for preference information associated with the first media asset and the second media asset. Once control circuitry 304 finds the first preference information and the second preference information associated with the first media asset and the second media asset, control circuitry 304 may retrieve that information from storage 308 or from media guidance data source 418. Control circuitry 304 may then use the retrieved information to determine an indication of similarity between the first media asset and the second media asset.

At 610, control circuitry 304 compares the indication of similarity to the expected media asset similarity value. For example, control circuitry 304 may transmit, to a model, media asset identifiers of the first media asset and the second media asset. The model may be located at media guidance data source 418. If the model is located in storage 308, control circuitry 304 may submit media asset identifiers for the first media asset and the second media asset to the model. Control circuitry 304 may receive from the model the expected similarity value. Once control circuitry 304 receives the expected similarity value, control circuitry 304 may compare the expected indication of similarity to the indication of similarity.

At 612, control circuitry 304 determines an error value based on the comparing. Once control circuitry 304 determines the error value, control circuitry 304 may store the error value in storage 308.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 6.

Figure 7:
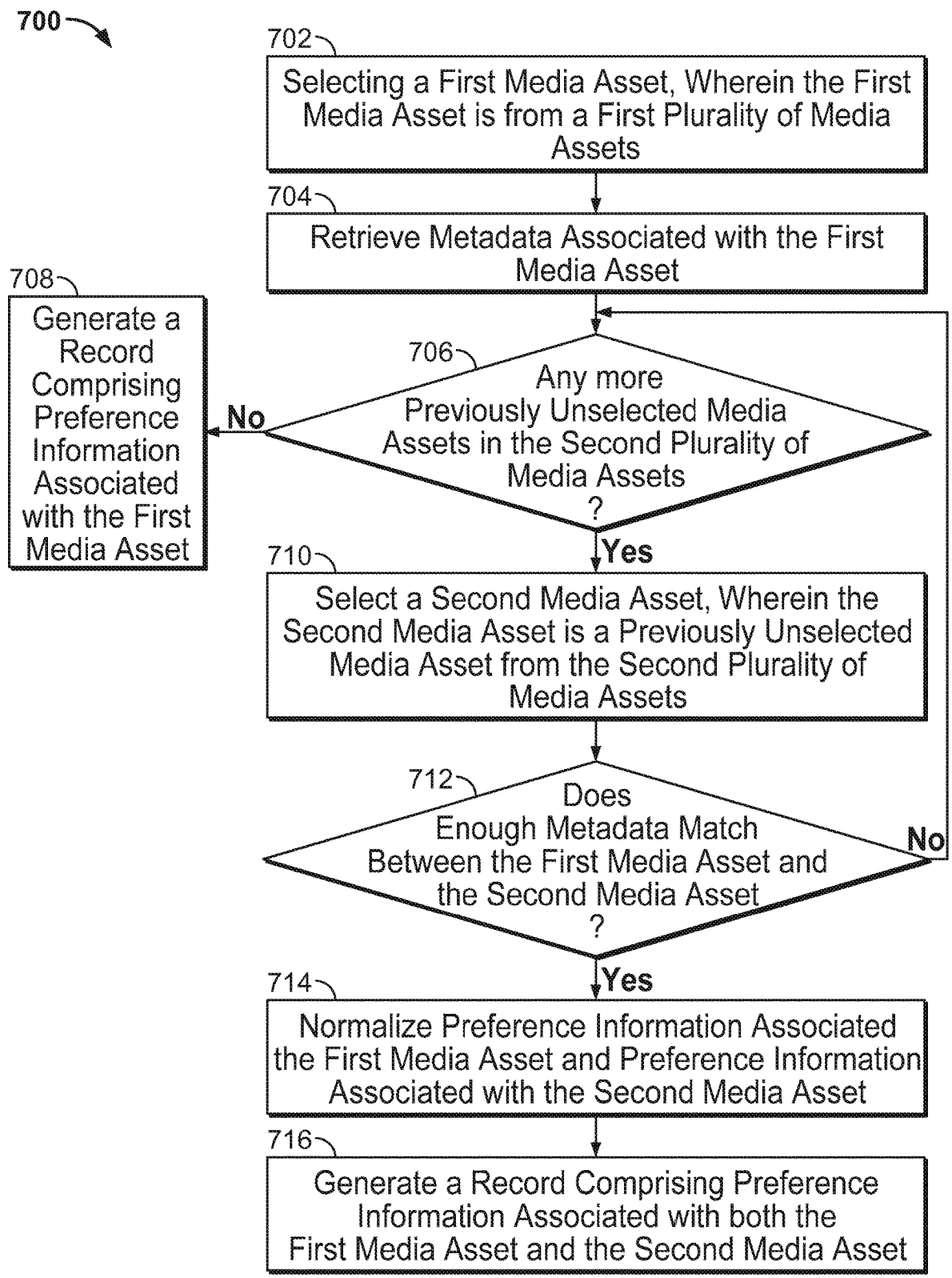
FIG. 7 is a flowchart of illustrative steps involved in determining whether to maintain a first level of media access restrictions or to set a second level of media access restrictions in accordance with some embodiments of the disclosure.

FIG. 7 is a flowchart of illustrative steps for normalizing user preference information from multiple data spaces. It should be noted that process 700 or any step thereof could be performed on, or provided by, any of the devices shown in FIGS. 3-4. For example, process 700 may be executed by control circuitry 304 (FIG. 3) as instructed by a media guidance application implemented on user equipment 402, 404, and/or 406 (FIG. 4) in order to distribute control of media guidance application operations for a target device among multiple user devices. In addition, one or more steps of process 700 may be incorporated into or combined with one or more steps of any other process or embodiment (e.g., process 600 (FIG. 6), process 800 (FIG. 8), process 1000 (FIG. 10), and process 1100 (FIG. 11)).

At 702, control circuitry 304 selects a first media asset, wherein the first media asset is from a first plurality of media assets. In order to select the first media asset, control circuitry 304 may access the first data space. The first data space may be stored in storage 308 or at media guidance data source 418 that may be accessed through communications network 414. The first data space may be stored in a variety of structures and be split among a number of servers. Some data spaces may require multiple servers and multiple database installations to store. Other data spaces may be smaller and may be stored in files.

At 704, control circuitry 304 retrieves metadata associated with the first media asset. Control circuitry 304 may retrieve the metadata from the same location as the first data space (e.g., storage 308 or media guidance data source 418). Alternatively or additionally, control circuitry 304 may retrieve the metadata from a separate structure such as a different file, XML document, or database. If the metadata is stored in a different structure, control circuitry 304 may be cross-reference the metadata with the selected media asset in order to determine which media asset is associated with a specific set of metadata attributes.

In 706, control circuitry 304 determines whether there are any more previously unselected media assets in a second plurality of media assets. Control circuitry 304 may determine whether any more previously unselected media assets exist in the second plurality of media assets by storing an identifier of each media asset that it previously selected. Control circuitry 304 may iterate through the identifiers to find one that it has not selected previously. If the determination is a No, the process moves to 708. If the determination is a Yes, the process moves to 710.

In 708, control circuitry 304 generates a record for the media asset that includes preference information associated with the first media asset. Control circuitry 304 may store the generated record in a structure such as a file, an XML document, or a database. Control circuitry 304 may store the record in storage 308 (FIG. 3) or at media guidance data source 418 (FIG. 4).

At 710, control circuitry 304 selects a second media asset, wherein the second media asset is a previously unselected media asset from the second plurality of media assets. The second plurality of media assets may be associated with a second data space. Control circuitry 304 may iterate through all the media assets in the second data space in order to find a previously unselected media asset.

At 712, control circuitry 304 compares metadata associated with the first media asset and metadata associated with the second media asset. If enough metadata matches between the first media asset and the second media asset, the process moves to 714. If enough metadata does not match, then the process reverts to 708.

At 714, control circuitry 304 normalizes preference information associated with the first media asset and the second media asset. As discussed above, control circuitry 304 may translate user preference information from different metrics into a single metric.

At 716, control circuitry 304 generates a record comprising preference information associated with both the first media asset and the second media asset. Control circuitry 304 may store the record in storage 308 (FIG. 3) or at media guidance data source 418 (FIG. 4).

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 7.

Figure 8:
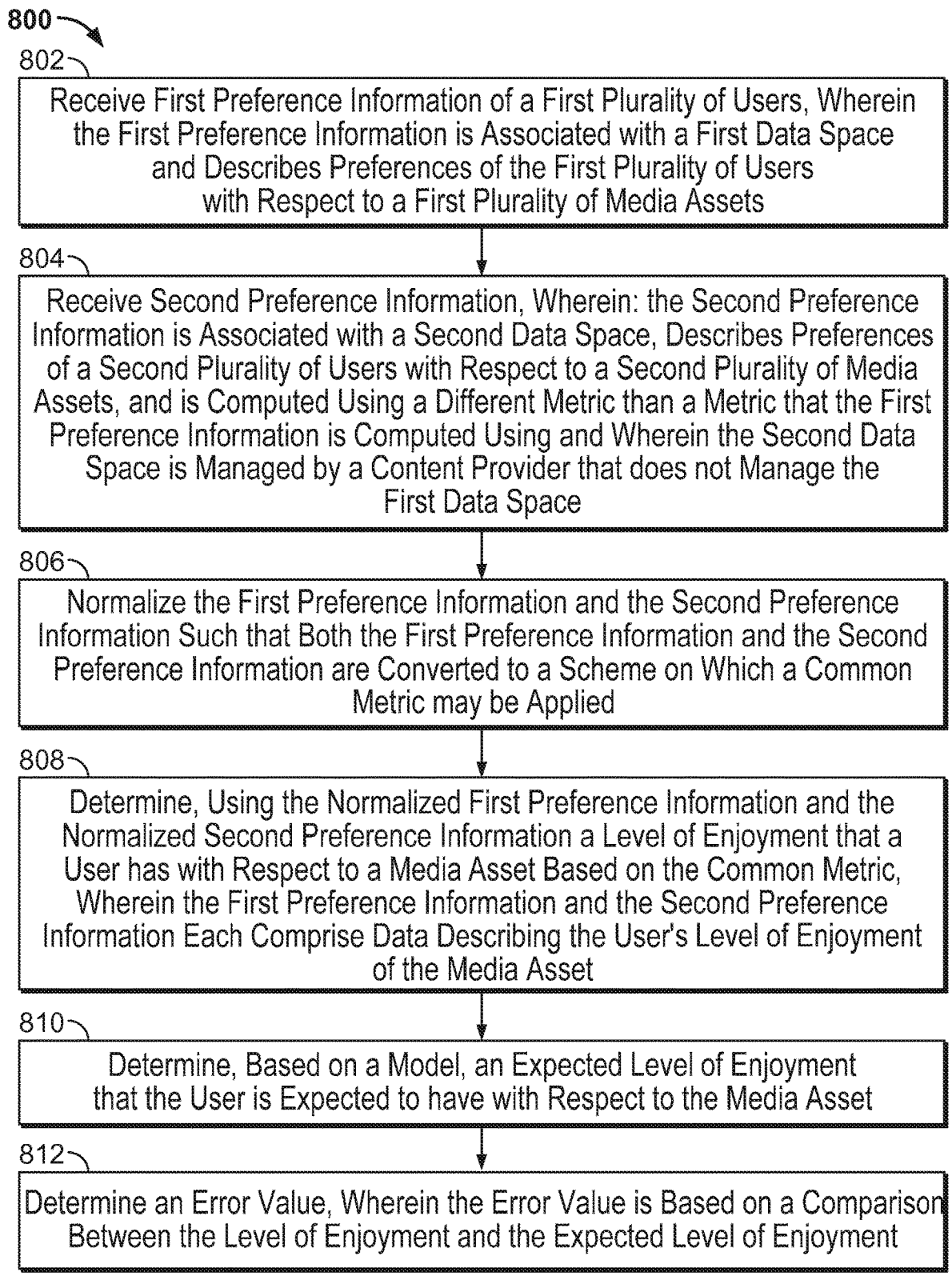
FIG. 8 is a flowchart of illustrative steps involved in generating a record based on normalized preference information from two data spaces, in accordance with some embodiments of the disclosure.

FIG. 8 is a flowchart of illustrative steps of a method for determining an error value for a model for estimating media asset ratings. It should be noted that process 800 or any step thereof could be performed on, or provided by, any of the devices shown in FIGS. 3-4. For example, process 800 may be executed by control circuitry 304 (FIG. 3) as instructed by a media guidance application implemented on user equipment 402, 404, and/or 406 (FIG. 4) in order to distribute control of media guidance application operations for a target device among multiple user devices. In addition, one or more steps of process 800 may be incorporated into or combined with one or more steps of any other process or embodiment (e.g., process 600 (FIG. 6), process 700 (FIG. 7), process 1000 (FIG. 10), and process 1100 (FIG. 11)).

At 802, control circuitry 304 receives first preference information of a first plurality of users, wherein the first preference information is associated with a first data space and describes preferences of the first plurality of users with respect to a first plurality of media assets. For example, control circuitry 304 may use communications network 414 (FIG. 4) in order to communicate with a content provider of the first data space or another entity where the first preference information may be received from. The first preference information may, for example, be first received by media guidance data source 418 (FIG. 4), and then control circuitry 304 may receive the first preference information from the media guidance data source 418. The first preference information may be stored in storage 308 or at the media guidance data source 418.

At 804, control circuitry 304 receives second preference information, wherein the second preference information is associated with a second data space, describes preferences of a second plurality of users with respect to a second plurality of media assets, and is computed using a different metric than a metric that the first preference information is computed using, and wherein the second data space is managed by a content provider that does not manage the first data space. For example, control circuitry 304 may use communications network 414 (FIG. 4) in order to communicate with a content provider of the first data space or another entity where the preference information may be received from. The preference information may, for example, be first received by media guidance data source 418 (FIG. 4), and then control circuitry 304 may receive the second preference information from the media guidance data source 418.

At 806, control circuitry 304 normalizes the first preference information and the second preference information such that both the first preference information and the second preference information are converted to a scheme on which a common metric may be applied. For example, control circuitry 304 may use a database in order to create a record for each media asset that exists in both the first data space and the second data space. The database may be located in storage 308 (FIG. 3) or at the media guidance data source 418. Control circuitry 304 may transmit the creation of the record to the database at the media guidance data source 418 via communications network 414. Control circuitry 304 may determine whether two media assets from different data spaces include the same content by comparing metadata entries retrieved from either storage 308 or from the media guidance data source 418 via communications network 414.

At 808, control circuitry 304 determines, using the normalized first preference information and the normalized second preference information, a user's level of enjoyment with respect to a media asset based on the common metric, wherein the first preference information and the second preference information each comprise data describing the user's level of enjoyment of the media asset. Control circuitry 304 may retrieve the normalized first preference information and the normalized second preference information from storage 308 (FIG. 3) or from media guidance data source 418 (FIG. 4). Control circuitry 304 may normalize the retrieved preference information.

At 810, control circuitry 304 determines, based on a model, an expected level of enjoyment that the user is expected to have with respect to the media asset. As described above, control circuitry 304 may transmit a media asset identifier to the model and receive back from the model an expected level of enjoyment that the user is expected to have with respect to the media asset.

At 812, control circuitry 304 determines an error value, wherein the error value is based on a comparison between the level of enjoyment and the expected level of enjoyment.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 8.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods. Furthermore, it should be noted that any of the devices or equipment discussed in relation to FIGS. 3-5 could be used to perform one or more of the steps in FIG. 6.

Figure 10:
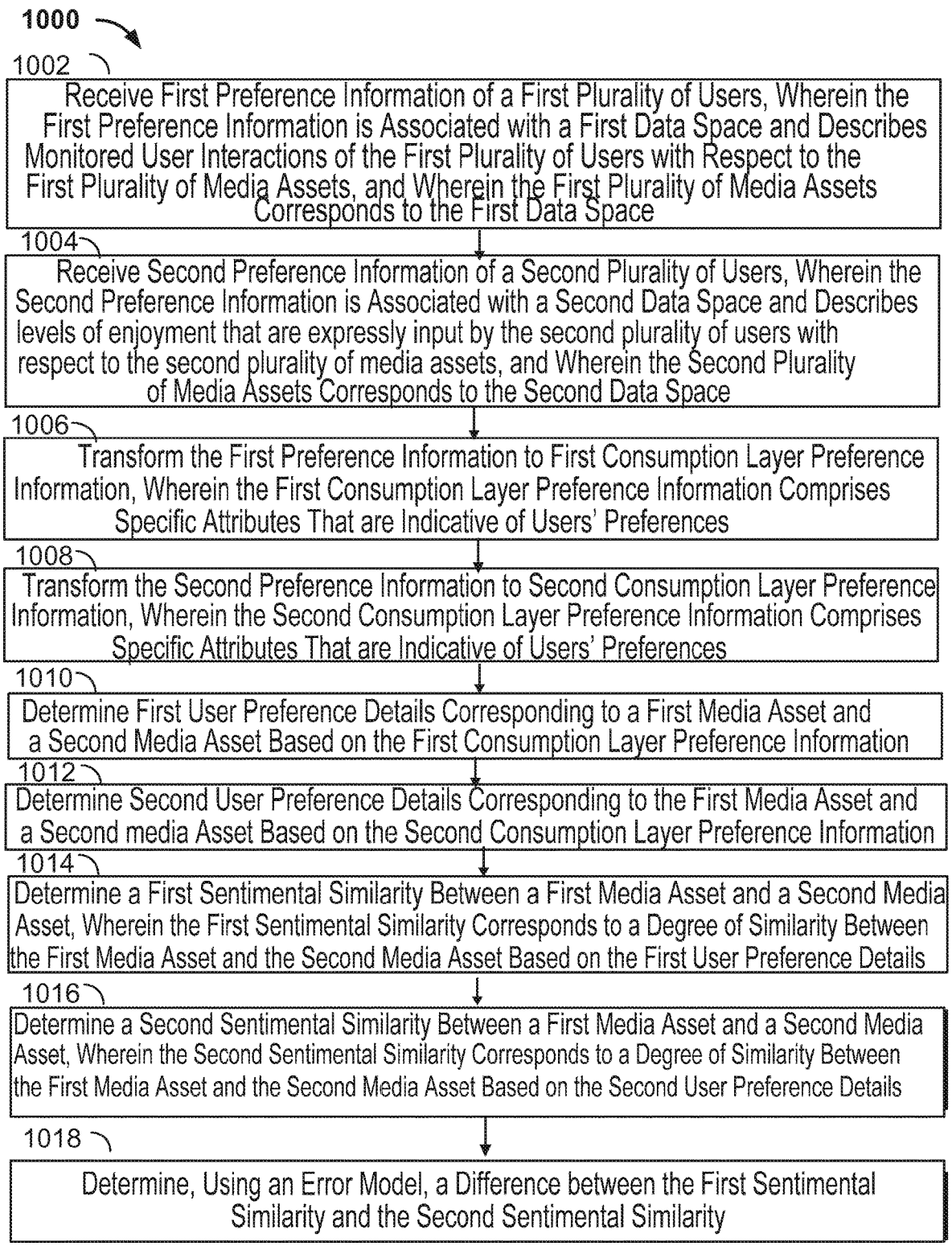
FIG. 10 is a flowchart of illustrative steps involved in processing media consumption information across multiple data spaces over a common media asset space, in accordance with some embodiments of the disclosure.

FIG. 10 is a flowchart of illustrative steps for processing media consumption information across multiple data spaces over a common media asset space. It should be noted that process 1000 or any step thereof could be performed on, or provided by, any of the devices shown in FIGS. 3-4. For example, process 1000 may be executed by control circuitry 304 (FIG. 3) as instructed by a media guidance application implemented on user equipment 402, 404, and/or 406 (FIG. 4) in order to distribute control of media guidance application operations for a target device among multiple user devices. In addition, one or more steps of process 1000 may be incorporated into or combined with one or more steps of any other process or embodiment (e.g., process 600 (FIG. 6), process 700 (FIG. 7), process 800 (FIG. 8), process 1100 (FIG. 11)).

At 1002, control circuitry 304 performs tasks of a consumption model and receives first preference information of a first plurality of users. The first preference information may be associated with a first data space and may describe monitored user interactions of the first plurality of users with respect to the first plurality of media assets. Further, the first plurality of media assets may correspond to the first data space. Control circuitry 304 may receive the first preference information in the same manner as it receives first preference information at step 602 of FIG. 6. Control circuitry 304 may receive the first preference information from media content source 416 and/or media guidance data source 418 via communications circuitry 414. Additionally or alternatively, control circuitry 304 may receive the first preference information from any source on the Internet via a communications network (e.g., communications network 414).

At 1004, control circuitry 304 performs tasks of a consumption model and receives second preference information of a second plurality of users. The second preference information may be associated with a second data space and may describe levels of enjoyment that are expressly input by the second plurality of users with respect to the second plurality of media assets. Further, the second plurality of media assets may correspond to the second data space. Control circuitry 304 may receive the second preference information in the same manner as it receives first or second preference information at steps 602 or 604 of FIG. 6. Control circuitry 304 may receive the second preference information from media content source 416 and/or media guidance data source 418 via communications circuitry 414. Additionally or alternatively, control circuitry 304 may receive the second preference information from any source on the Internet via a communications network (e.g., communications network 414).

At 1006, control circuitry 304 transforms the first preference information to first consumption layer preference information, where the first consumption layer preference information includes specific attributes that are indicative of users' preferences. Control circuitry 304 may be configured to implement formulas described above as executable instructions in order to make the transformation. Additionally or alternatively, control circuitry 304 may make the transformation in the same manner as during the process of normalizing first and second preference information described above.

At 1008, control circuitry 304 transforms the second preference information to second consumption layer preference information, where the second consumption layer preference information includes specific attributes that are indicative of users' preferences. Control circuitry 304 may be configured to implement formulas described above as executable instructions in order to make the transformation. Additionally or alternatively, control circuitry 304 may make the transformation in the same manner as during the process of normalizing first and second preference information described above.

At 1010, control circuitry 304 performs tasks of a preference model and determines first user preference details corresponding to a given media asset based on the first consumption layer preference information. Control circuitry 304 may be configured to implement formulas described above as executable instructions in order to make the determination. Additionally or alternatively, control circuitry 304 may make the determination in the same manner as during the process of normalizing first and second preference information described above.

At 1012, control circuitry 304 performs tasks of a preference model and determines second user preference details corresponding to a given media asset based on the second consumption layer preference information. Control circuitry 304 may be configured to implement formulas described above as executable instructions in order to make the determination. Additionally or alternatively, control circuitry 304 may make the determination in the same manner as during the process of normalizing first and second preference information described above.

At 1014, control circuitry 304 performs tasks of a similarity model and determines a first sentimental similarity between a first media asset and a second media asset, where the first sentimental similarity corresponds to a degree of similarity between the first media asset and the second media asset based on the first user preference details. Control circuitry 304 may make this determination in the same manner as described above with respect to step 608 of FIG. 6.

At 1016, control circuitry 304 performs tasks of a similarity model and determines a second sentimental similarity between the first media asset and the second media asset, where the second sentimental similarity corresponds to a degree of similarity between the first media asset and the second media asset based on the second user preference details. Control circuitry 304 may make this determination in the same manner as described above with respect to step 608 of FIG. 6.

At 1018, control circuitry 304 performs tasks of a similarity model and determines a difference between the first sentimental similarity and the second sentimental similarity. Control circuitry 304 may make this determination in the same manner as at step 610 of FIG. 6.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods. Furthermore, it should be noted that any of the devices or equipment discussed in relation to FIGS. 3-5 could be used to perform one or more of the steps in FIG. 10.

Figure 11:
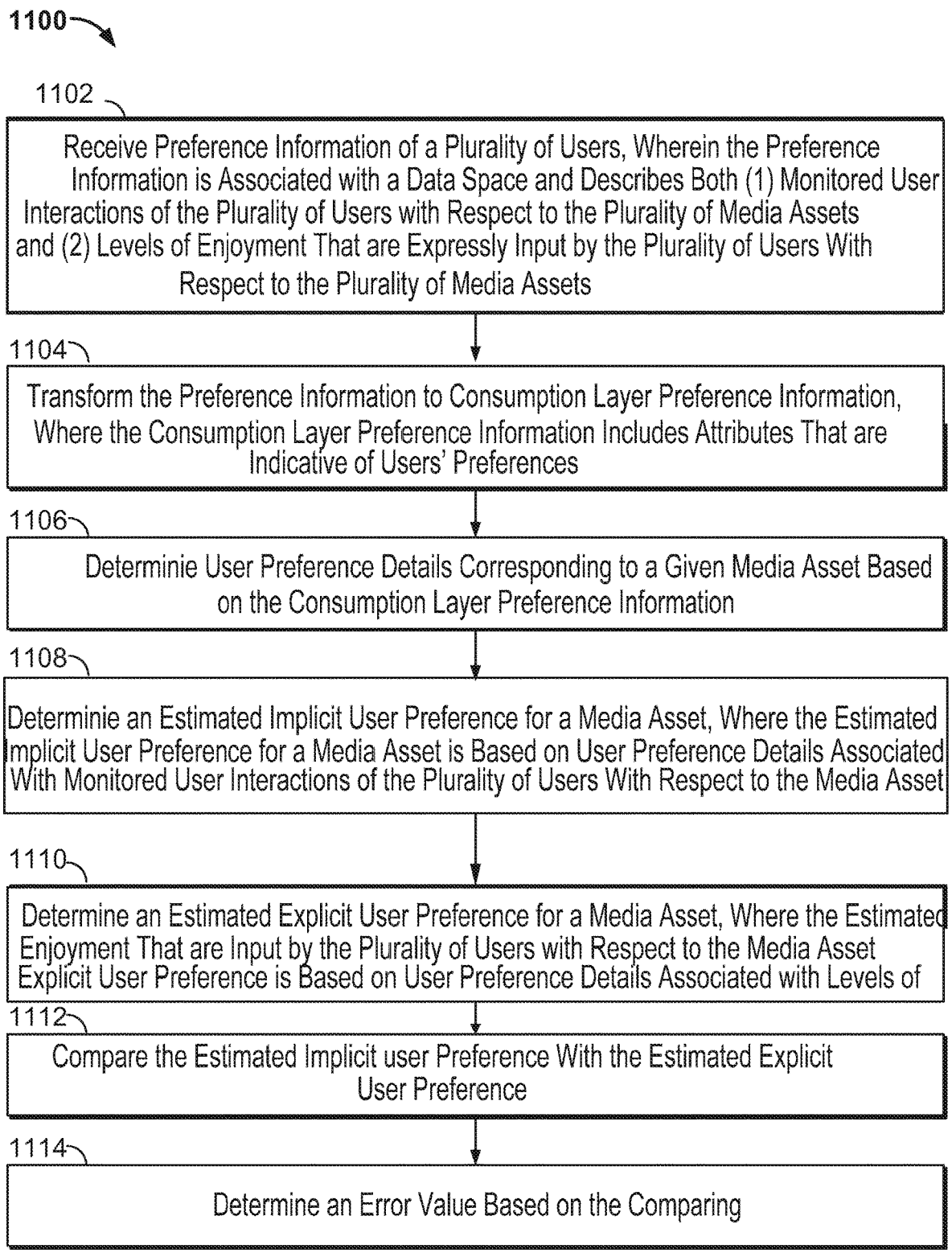
FIG. 11 is a flowchart of illustrative steps involved in processing media consumption information across a data space with different types of user preference information, in accordance with some embodiments of the disclosure.

FIG. 11 is a flowchart of illustrative steps for processing media consumption information across a data space with different types of user preference information. It should be noted that process 1100 or any step thereof could be performed on, or provided by, any of the devices shown in FIGS. 3-4. For example, process 1100 may be executed by control circuitry 304 (FIG. 3) as instructed by a media guidance application implemented on user equipment 402, 404, and/or 406 (FIG. 4) in order to distribute control of media guidance application operations for a target device among multiple user devices. In addition, one or more steps of process 1100 may be incorporated into or combined with one or more steps of any other process or embodiment (e.g., process 600 (FIG. 6), process 700 (FIG. 7), process 800 (FIG. 8), process 1000 (FIG. 10)).

At 1102, control circuitry 304 performs tasks of a consumption model and receives preference information of a plurality of users. The preference information is associated with a data space. Further, the preference information describes both (1) monitored user interactions of the plurality of users with respect to the plurality of media assets and (2) levels of enjoyment that are expressly input by the plurality of users with respect to the plurality of media assets. Control circuitry 304 may receive the preference information in the same manner as at step 602 of FIG. 6.

At 1104, control circuitry 304 transforms the preference information to consumption layer preference information, where the consumption layer preference information includes attributes that are indicative of users' preferences. Control circuitry 304 may perform the transformation in the same manner as at steps 1006 and/or 1008 of FIG. 10.

At 1106, control circuitry 304 performs tasks of a preference model and determines user preference details corresponding to a given media asset based on the consumption layer preference information. Control circuitry 304 may make the determination in the same manner as in steps 1010 and/or 1012 of FIG. 10.

At 1108, control circuitry 304 performs tasks of a preference model and determines an estimated implicit user preference for a media asset, where the estimated implicit user preference for a media asset is based on user preference details associated with monitored user interactions of the plurality of users with respect to the media asset. Control circuitry 304 may make the determinations in the same manner as at steps 808 and/or 810 of FIG. 8.

At 1110, control circuitry 304 performs tasks of a preference model and determines an estimated explicit user preference for a media asset, where the estimated explicit user preference for a media asset is based on user preference details associated with levels of enjoyment that are input by the plurality of users with respect to the media asset. Control circuitry 304 may make the determinations in the same manner as at steps 808 and/or 810 of FIG. 8.

At 1112, control circuitry 304 performs tasks of an error model and compares the estimated implicit user preference with the estimated explicit user preference. Control circuitry 304 may make the comparison in the same manner as at step 812 of FIG. 8 as part of determining an error value.

At 1114, control circuitry 304 determines an error value based on the comparing. Control circuitry 304 may make a determination in the same manner as in FIG. 6, FIG. 8, and/or FIG. 10.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods. Furthermore, it should be noted that any of the devices or equipment discussed in relation to FIGS. 3-5 could be used to perform one or more of the steps in FIG. 11.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM devices, or a random access memory, such as a hard drive device or a computer diskette, having a computer-readable program code stored thereon. It should also be understood that methods, techniques, and processes involved in the present invention may be executed using processing circuitry. For instance, determination of media asset ranking may be performed by processing circuitry, e.g., by processing circuitry 306 of FIG. 3. The processing circuitry, for instance, may be a general purpose processor, a customized integrated circuit (e.g., an ASIC), or a field-programmable gate array (FPGA) within user equipment 300, media content source 416, or media guidance data source 418. For example, the media asset attributes as described herein may be stored in, and retrieved from, storage 308 of FIG. 3, or media guidance data source 418 of FIG. 4. Furthermore, processing circuitry, or a computer program, may update settings associated with a user, such as user profile preferences, updating the information stored within storage 308 of FIG. 3 or media guidance data source 418 of FIG. 4.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for determining an error value based on comparing an expected media asset similarity value corresponding to a first media asset and a second media asset, as determined using a model, to a media asset similarity value determined from user preference information associated with multiple data spaces, the method comprising:
    determining, using a similarity model, the expected media asset similarity value based on a first user's preference information between the first media asset and the second media asset, wherein the expected media asset similarity value corresponds to a degree of similarity between the first media asset and the second media asset;
    receiving first preference information of a first plurality of users, wherein the first preference information is associated with a first data space and describes preferences of the first plurality of users with respect to a first plurality of media assets;
    receiving second preference information, wherein:
        the second preference information is associated with a second data space, describes preferences of a second plurality of users with respect to a second plurality of media assets, and is computed using a different metric than a metric that the first preference information is computed using, and wherein
        the second data space is managed by a content provider that does not manage the first data space;
    normalizing the first preference information and the second preference information such that both the first preference information and the second preference information are converted to a scheme on which a common metric may be applied;
    determining, using the normalized first preference information and the normalized second preference information, an indication of similarity based on the preferences of the first plurality of users in the first preference information and the preferences of the second plurality of users in the second preference information between the first media asset and the second media asset, wherein the first preference information and the second preference information each comprise preference data corresponding to the first media asset and the second media asset;
    comparing the indication of similarity between the first media asset and the second media asset with the expected media asset similarity value corresponding to the degree of similarity between the first media asset and the second media asset;
    determining an error value between the indication of similarity based on the preferences of the first plurality of users in the first preference information and the preferences of the second plurality of users in the second preference information and the expected media asset similarity value based on a first user's preference information;
    providing the error value and data associated with the error value to the model; and
    updating the model based on the error value and the data associated with the error value.

2. The method of claim 1, wherein the preferences of a first user of the first plurality of users with respect to the first media asset of the first plurality of media assets comprise data associated with interactions of the first user with the first media asset, and wherein the data associated with the interactions of the first user with the first media asset comprise at least one of whether the first user consumed the first media asset, the length of time the first user consumed the first media asset, the percentage of the first media asset that the first user consumed, whether the first user rated the first media asset, the rating the first user gave the first media asset, whether the first user paused the first media asset, whether the first user interacted with ads while consuming the first media asset, whether the first user's eyes turned away from watching the first media asset, whether the first user paid a fee for consuming the first media asset, the amount of the fee, whether the first user consumed other episodes of the first media asset if the first media asset is an episode of a series, and a number of other episodes consumed by the first user in the series.

3. The method of claim 1, wherein normalizing the first preference information and the second preference information such that both the first preference information and the second preference information are converted to a scheme on which a common metric may be applied comprises:
    determining, for the first media asset of the first plurality of media assets whether the first media asset is also within the second plurality of media assets; and
    in response to determining that the first media asset is also within the second plurality of media assets, generating a record for the first media asset, wherein the record comprises preference information that is retrieved from both the first data space and the second data space.

4. The method of claim 3, wherein the determining, for the first media asset of the first plurality of media assets, whether the first media asset is also within the second plurality of media assets comprises:
    identifying metadata of the first media asset;
    comparing the identified metadata of the first media asset with metadata of a media asset of the second plurality of media assets;
    determining whether the metadata of the first media asset sufficiently matches the metadata of the media asset of the second plurality of media assets; and
    in response to determining that the metadata of the first media asset sufficiently matches the metadata of the media asset of the second plurality of media assets, determining that the content of the first media asset matches the content of the media asset of the second plurality of media assets.

5. The method of claim 4, further comprising adding, to the record, at least one of: data describing interactions of the first plurality of users with the first media asset, data describing indications of a level of enjoyment of the first media asset provided by the first plurality of users, describing interactions of the second plurality of users with the media asset of the second plurality of media assets, and indications of a level of enjoyment of the media asset of the second plurality of media assets provided by the second plurality of users.

6. The method of claim 1, wherein determining, using the normalized first preference information and the normalized second preference information, the indication of similarity between the first media asset and the second media asset further comprises:
   calculating a first confidence value in the indication of similarity between the first media asset and the second media asset based on the first preference information;
   calculating a second confidence value in the indication of similarity between the first media asset and the second media asset based on the second preference information;
   determining an average confidence value based on the first confidence value and the second confidence value; and
   adjusting the indication of similarity between the first media asset and the second media asset based on the average confidence value.

7. The method of claim 6, wherein the first confidence value in the indication of similarity between the first media asset and the second media asset is based on an amount of data associated with the first media asset and an amount of data associated with the second media asset in the first data space.

8. The method of claim 6, wherein determining the average confidence value based on the first confidence value and the second confidence value further comprises:
   determining a particularity of the first preference information;
   determining a particularity of the second preference information;
   calculating an average particularity value based on the particularity value of the first preference information and the particularity value of the second preference information; and
   determining the average confidence value based on the average particularity value.

9. The method of claim 1, wherein updating the model based on the error value and the data associated with the error value comprises:
   computing a derivative of a composition of both (1) a function used to determine the indication of similarity between a first media asset and the second media asset and (2) a function to determine the expected media asset similarity value; and
   updating the model based on the computed derivative.

10. A system for determining an error value based on comparing an expected media asset similarity value corresponding to a first media asset and a second media asset, as determined using a model, to a media asset similarity value determined from user preference information associated with multiple data spaces, the system comprising:
   communications circuitry configured to:
      receive first preference information of a first plurality of users, wherein the first preference information is and associated with a first data space and describes preferences of the first plurality of users with respect to a first plurality of media assets;
      receive second preference information, wherein:
         the second preference information is associated with a second data space, describes preferences of a second plurality of users with respect to a second plurality of media assets, and is computed using a different metric than a metric that the first preference information is computed using, and wherein the second data space is managed by a content provider that does not manage the first data space; and
   control circuitry configured to:
      determine, using a similarity model, the expected media asset similarity value based on a first user's preference information between the first media asset and the second media asset, wherein the expected media asset similarity value corresponds to a degree of similarity between the first media asset and the second media asset;
      normalize the first preference information and the second preference information such that both the first preference information and the second preference information are converted to a scheme on which a common metric may be applied;
      determine, using the normalized first preference information and the normalized second preference information, an indication of similarity based on the preferences of the first plurality of users in the first preference information and the preferences of the second plurality of users in the second preference information between a first media asset and a second media asset, wherein the first preference information and the second preference information each comprise preference data corresponding to the first media asset and the second media asset;
      compare the indication of similarity between the first media asset and the second media asset with the expected media asset similarity value corresponding to the degree of similarity between the first media asset and the second media asset;
      determine an error value between the indication of similarity based on the preferences of the first plurality of users in the first preference information and the preferences of the second plurality of users in the second preference information and the expected media asset similarity value based on a first user's preference information;
      provide the error value and data associated with the error value to the model; and
      update the model based on the error value and the data associated with the error value.

11. The system of claim 10, wherein the preferences of a first user of the first plurality of users with respect to the first media asset of the first plurality of media assets comprise data associated with interactions of the first user with the first media asset, and wherein the data associated with the interactions of the first user with the first media asset comprise at least one of whether the first user consumed the first media asset, the length of time the first user consumed the first media asset, the percentage of the first media asset that the first user consumed, whether the first user rated the first media asset, the rating the first user gave the first media asset, whether the first user paused the first media asset, whether the first user interacted with ads while consuming the first media asset, whether the first user's eyes turned away from watching the first media asset, whether the first user paid a fee for consuming the first media asset, the amount of the fee, whether the first user consumed other episodes of the first media asset if the first media asset is an episode of a series, and a number of other episodes consumed by the first user in the series.

12. The system of claim 10, wherein the control circuitry is further configured, when normalizing the first preference information and the second preference information such that both the first preference information and the second preference information are converted to a scheme on which a common metric may be applied, to:

determine, for the first media asset of the first plurality of media assets whether the first media asset is also within the second plurality of media assets; and in response to determining that the first media asset is also within the second plurality of media assets, generate a record for the first media asset, wherein the record comprises preference information that is retrieved from both the first data space and the second data space.

13. The system of claim 12, wherein the control circuitry is further configured, when determining, for the first media asset of the first plurality of media assets, whether the first media asset is also within the second plurality of media assets, to:

identify metadata of the first media asset;

compare the identified metadata of the first media asset with metadata of a media asset of the second plurality of media assets;

determine whether the metadata of the first media asset sufficiently matches the metadata of the media asset of the second plurality of media assets; and in response to determining that the metadata of the first media asset sufficiently matches the metadata of the media asset of the second plurality of media assets, determine that the content of the first media asset matches the content of the media asset of the second plurality of media assets.

14. The system of claim 13, further comprising control circuitry configured to:

add, to the record, at least one of: data describing interactions of the first plurality of users with the first media asset, data describing indications of a level of enjoyment of the first media asset provided by the first plurality of users, describing interactions of the second plurality of users with the media asset of the second plurality of media assets, and indications of a level of enjoyment of the media asset of the second plurality of media assets provided by the second plurality of users.

15. The system of claim 10, wherein the control circuitry is further configured, when determining, using the normalized first preference information and the normalized second preference information, the indication of similarity between the first media asset and the second media asset, to:

calculate a first confidence value in the indication of similarity between the first media asset and the second media asset based on the first preference information;

calculate a second confidence value in the indication of similarity between the first media asset and the second media asset based on the second preference information;

determine an average confidence value based on the first confidence value and the second confidence value; and adjust the indication of similarity between the first media asset and the second media asset based on the average confidence value.

16. The system of claim 15, wherein the first confidence value in the indication of similarity between the first media asset and the second media asset is based on an amount of data associated with the first media asset and an amount of data associated with the second media asset in the first data space.

17. The system of claim 15, wherein the control circuitry is further configured, when determining the average confidence value based on the first confidence value and the second confidence value, to:

determine a particularity of the first preference information;

determine a particularity of the second preference information;

calculate an average particularity value based on the particularity value of the first preference information and the particularity value of the second preference information; and determine the average confidence value based on the average particularity value.

18. The system of claim 10, wherein the control circuitry is further configured, when updating the model based on the error value and the data associated with the error value, to:

compute a derivative of a composition of both (1) a function used to determine the indication of similarity between a first media asset and the second media asset and (2) a function to determine the expected media asset similarity value; and update the model based on the computed derivative.

\* \* \* \* \*